US012597094B2

(12) United States Patent
Ma et al.

(10) Patent No.: US 12,597,094 B2
(45) Date of Patent: Apr. 7, 2026

(54) ACTIVE DEPTH SENSING

(71) Applicant: QUALCOMM Incorporated, San Diego, CA (US)

(72) Inventors: Jian Ma, San Diego, CA (US); Shen-Ge Wang, Santa Clara, CA (US); Liming Wu, West Lafayette, IN (US); Matthieu Jean Olivier Dupre, La Jolla, CA (US); Sergiu Radu Goma, Sedona, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 587 days.

(21) Appl. No.: 18/069,183

(22) Filed: Dec. 20, 2022

(65) Prior Publication Data

US 2024/0127401 A1 Apr. 18, 2024

Related U.S. Application Data

(60) Provisional application No. 63/379,631, filed on Oct. 14, 2022.

(51) Int. Cl.
*G06T 5/50* (2006.01)
*G01S 7/4865* (2020.01)
(Continued)

(52) U.S. Cl.
CPC .............. *G06T 5/50* (2013.01); *G01S 7/4865* (2013.01); *G06T 7/0002* (2013.01); *G06T 7/521* (2017.01);
(Continued)

(58) Field of Classification Search
CPC ......... G06T 5/50; G06T 7/521; G06T 7/0002; G06T 2207/10028; G06T 2207/20221; G06T 2207/30168; G01S 7/4865
See application file for complete search history.

(56) References Cited

U.S. PATENT DOCUMENTS 9,769,461 B2 * 9/2017 Appia .................. H04N 13/271
10,613,228 B2 * 4/2020 Fenton .................... G01S 17/10
(Continued)

FOREIGN PATENT DOCUMENTS

CN 113325437 A 8/2021
WO 2018217367 A1 11/2018

OTHER PUBLICATIONS

International Search Report and Written Opinion—PCT/US2023/074655—ISA/EPO—Dec. 8, 2023.
(Continued)

*Primary Examiner* — Gregory M Desire
(74) *Attorney, Agent, or Firm* — QUALCOMM Incorporated

(57) ABSTRACT

Systems and techniques are described for depth sensing. For example, a method can include obtaining a first depth image of a scene. The first depth image of the scene is associated with a first illumination configuration including illuminating the scene with a first type of illumination. The method can include obtaining a second depth image of the scene, wherein the second depth image is associated with a second illumination configuration, different from the first illumination configuration. The second illumination configuration includes illuminating the scene with a second type of illumination. The method can include determining, based on the second depth image, multipath interference (MPI) associated with the first depth image. The method can further include generating based on determining the MPI associated with the first depth image an adjusted depth image including one or more pixels from the first depth image and one or more adjusted pixels.

28 Claims, 15 Drawing Sheets

(51) Int. Cl.
    *G06T 7/00*            (2017.01)
    *G06T 7/521*          (2017.01)

(52) U.S. Cl.
    CPC .............. *G06T 2207/10028* (2013.01); *G06T 2207/20221* (2013.01); *G06T 2207/30168* (2013.01)

(56)           References Cited

U.S. PATENT DOCUMENTS

| | | | |
|---|---|---|---|
| 10,739,463 B2 * | 8/2020 | Koppal | G01S 17/894 |
| 10,839,539 B2 * | 11/2020 | Kowdle | G06T 7/593 |
| 11,132,805 B2 * | 9/2021 | Hall | G01S 7/4813 |
| 2018/0278910 A1 * | 9/2018 | Schoenberg | G01S 17/42 |
| 2020/0386540 A1 | 12/2020 | Hseih et al. | |

OTHER PUBLICATIONS

Kirmani A., et al., "SPUMIC: Simultaneous Phase Unwrapping and Multipath Interference Cancellation in Time-of-flight Cameras Using Spectral Methods", 2013 IEEE International Conference on Multimedia and Expo (ICME), Jul. 15, 2013, 6 Pages, XP032488069, The Whole Document.

* cited by examiner

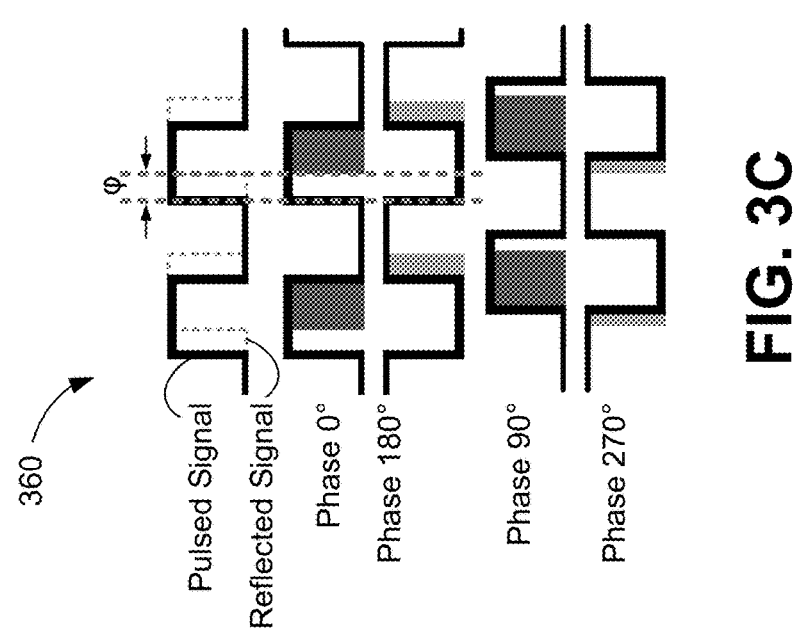
FIG. 3C
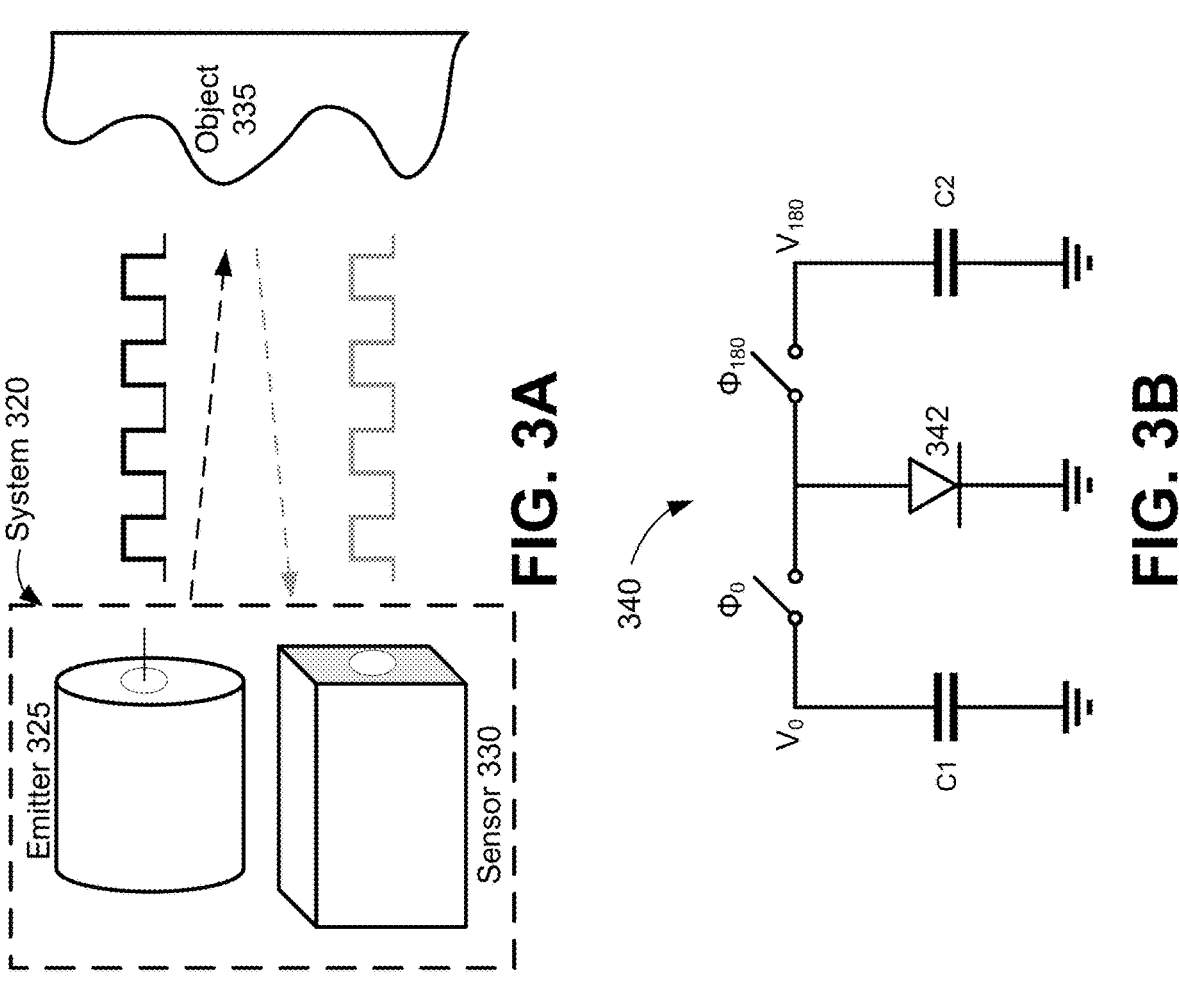
FIG. 3A
FIG. 3B

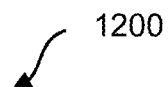

Obtain A First Depth Image Of A Scene, Wherein The First Depth Image Of The Scene Is Associated With A First Illumination Configuration, Wherein The First Illumination Configuration Comprises Illuminating The Scene With A First Type Of Illumination
1202

Obtain A Second Depth Image Of The Scene, Wherein The Second Depth Image Is Associated With A Second Illumination Configuration, The Second Illumination Configuration Being Different From The First Illumination Configuration, Wherein The Second Illumination Configuration Comprises Illuminating The Scene With A Second Type Of Illumination, Wherein The Second Type Of Illumination Is Different From The First Type Of Illumination
1204

Determine, Based On The Second Depth Image, Multipath Interference (MPI) Associated With The First Depth Image
1206

Generate, Based On Determining The MPI Associated With The First Depth Image An Adjusted Depth Image, Wherein The Adjusted Depth Image Includes One Or More Pixels From The First Depth Image And One Or More Adjusted Pixels Based On One Or More Additional Depth Images, Different From The First Depth Image
1208

FIG. 12

ACTIVE DEPTH SENSING

CROSS-REFERENCE TO RELATED APPLICATIONS

This application claims the benefit of U.S. Provisional Application No. 63/379,631, filed Oct. 14, 2022, the disclosure of which is hereby incorporated by reference, in its entirety and for all purposes.

TECHNICAL FIELD

This disclosure relates generally to depth sensing systems and specifically to improving the resolution of depth information.

BACKGROUND

A device may determine distances of its surroundings using various active-or-passive depth sensing techniques. Passive depth sensing systems measure reflected ambient light. Active depth sensing systems emit waves from a non-ambient source of light (e.g., an illuminator, a light emitting diode (LED), a laser, or another suitable light source) and measure the corresponding reflected energy. For example, an active depth sensing system, or device, may generate depth information, illustrating or otherwise indicating depths from the device to a scene or one or more objects in the scene. The active depth sensing system may emit one or more light pulses and measure reflections of the light pulses from the objects or scene. Example active depth techniques include time-of-flight (ToF) and structured light (SL).

In a ToF system, light is emitted from a transmitter (or "projector"), and a reflection of the light is received at a receiver (or "sensor"). In some implementations, the round-trip time of the light from the transmitter to the receiver is determined, and the distance or depth of an object reflecting the emitted light can be determined from the round trip time. In some cases, a ToF system that directly measures round-trip travel time can be referred to as a direct time of flight (dToF) system. In some implementations, dToF depth sensing can require high-speed detectors and high gain photosensors. For example, some dToF system receivers can include avalanche photodiodes. In some cases, high-resolution image sensor arrays with avalanche photodiodes may not be commercially available. In some cases, an indirect time (iToF) of flight depth sensing can be used. In some cases, an iToF measures the distance from scene to every pixel of the camera by measuring the phase difference between emitted light and its reflection from the scene. ToF systems are useful for many applications based on size, accuracy, performance indices, and cost. For example, ToF systems provide depth information faster and more reliably at the hardware level than, for example, stereo multi-camera systems that require more complex processing.

A SL system may include a light emitter (or "transmitter" or "projector") to project a distribution of infrared (IR) light (such as a distribution of IR light points) onto a scene. The system or device may also include a sensor (or "receiver") that senses the reflections of the distribution of light to determine distances of objects in the scene. The emitter and the sensor are separated by a distance, and displacement and distortion of the spatial distribution occurs at the sensor as a result. The SL system determines a distance or depth of an object reflecting the emitted light back to the system, for example, using triangulation with the displacement and distortion of the spatial distribution and the distance between the transmitter and receiver.

BRIEF SUMMARY

Disclosed are systems, apparatuses, methods, and computer-readable media for depth sensing. According to at least one example, a method is provided for depth sensing. The method includes: obtaining a first depth image of a scene, wherein the first depth image of the scene is associated with a first illumination configuration, wherein the first illumination configuration comprises illuminating the scene with a first type of illumination; obtaining a second depth image of the scene, wherein the second depth image is associated with a second illumination configuration, the second illumination configuration being different from the first illumination configuration, wherein the second illumination configuration comprises illuminating the scene with a second type of illumination, wherein the second type of illumination is different from the first type of illumination; determining, based on the second depth image, multipath interference (MPI) associated with the first depth image; and generating, basing on determining the MPI associated with the first depth image an adjusted depth image, wherein the adjusted depth image includes one or more pixels from the first depth image and one or more adjusted pixels based on one or more additional depth images, different from the first depth image.

In another example, an apparatus for depth sensing is provided that includes at least one memory and at least one processor coupled to the at least one memory. The at least one processor is configured to: obtain a first depth image of a scene, wherein the first depth image of the scene is associated with a first illumination configuration, wherein the first illumination configuration comprises illuminating the scene with a first type of illumination; obtain a second depth image of the scene, wherein the second depth image is associated with a second illumination configuration, the second illumination configuration being different from the first illumination configuration, wherein the second illumination configuration comprises illuminating the scene with a second type of illumination, wherein the second type of illumination is different from the first type of illumination; determining, based on the second depth image, multipath interference (MPI) associated with the first depth image; and generating, based on determining the MPI associated with the first depth image an adjusted depth image, wherein the adjusted depth image includes one or more pixels from the first depth image and one or more adjusted pixels based on one or more additional depth images, different from the first depth image.

In another example, a non-transitory computer-readable medium is provided that has stored thereon instructions that, when executed by one or more processors, cause the one or more processors to: obtain a first depth image of a scene, wherein the first depth image of the scene is associated with a first illumination configuration, wherein the first illumination configuration comprises illuminating the scene with a first type of illumination; obtain a second depth image of the scene, wherein the second depth image is associated with a second illumination configuration, the second illumination configuration being different from the first illumination configuration, wherein the second illumination configuration comprises illuminating the scene with a second type of illumination, wherein the second type of illumination is different from the first type of illumination; determining, based on the second depth image, multipath interference (MPI) associated with the first depth image; and generating, based on determining the MPI associated with the first depth image an adjusted depth image, wherein the adjusted depth image includes one or more pixels from the first depth image and one or more adjusted pixels based on one or more additional depth images, different from the first depth image.

In another example, an apparatus for depth sensing is provided. The apparatus includes: means for obtaining a first depth image of a scene, wherein the first depth image of the scene is associated with a first illumination configuration, wherein the first illumination configuration comprises illuminating the scene with a first type of illumination; means for obtaining a second depth image of the scene, wherein the second depth image is associated with a second illumination configuration, the second illumination configuration being different from the first illumination configuration, wherein the second illumination configuration comprises illuminating the scene with a second type of illumination, wherein the second type of illumination is different from the first type of illumination; determining, based on the second depth image, multipath interference (MPI) associated with the first depth image; and generating, means for basing on determining the MPI associated with the first depth image an adjusted depth image, wherein the adjusted depth image includes one or more pixels from the first depth image and one or more adjusted pixels based on one or more additional depth images, different from the first depth image.

In some aspects, one or more of the apparatuses described above is, is part of, or includes a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a vehicle (e.g., a computing device of a vehicle), or other device. In some aspects, an apparatus includes a camera or multiple cameras for capturing one or more images. In some aspects, the apparatus includes a display for displaying one or more images, notifications, and/or other displayable data. In some aspects, the apparatus can include one or more sensors. In some cases, the one or more sensors can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Aspects of the present disclosure are illustrated by way of example, and not by way of limitation, in the figures of the accompanying drawings and in which like reference numerals refer to similar elements.

FIG. 3A illustrates an example ToF system including an emitter and a sensor, in accordance with some examples of the present disclosure;

FIG. 3B illustrates an example sensor pixel, in accordance with some examples of the present disclosure;

FIG. 3C illustrates a pulse diagram illustrating a pulsed signal from a transmitter and a corresponding reflection signal received at a sensor, in accordance with some examples of the present disclosure;

FIG. 12 is a flow diagram illustrating an example of a process for processing one or more frames, in accordance with some examples of the present disclosure.

DETAILED DESCRIPTION

Figure 1:
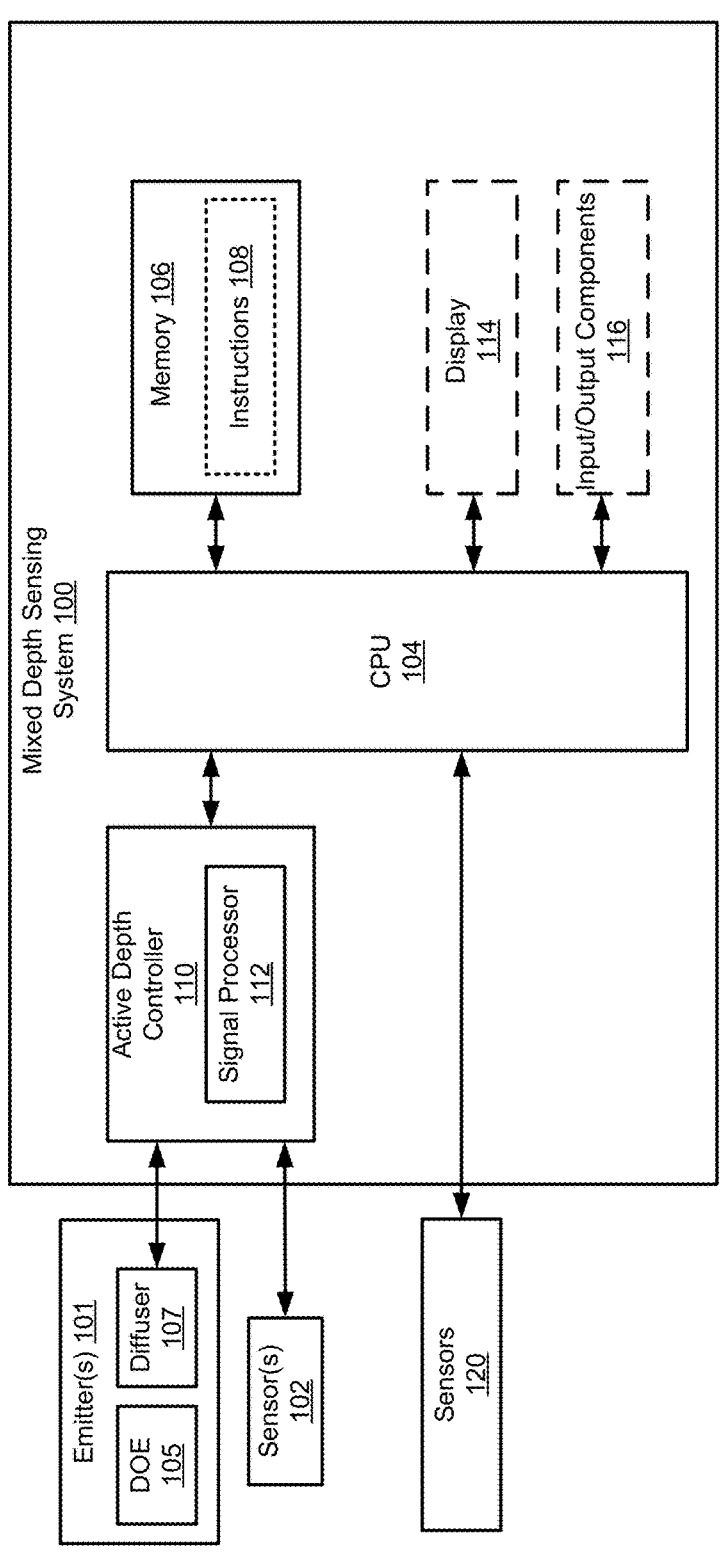
FIG. 1 shows a block diagram of an example device including a mixed depth sensing system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Aspects of the present disclosure relate to active depth sensing systems and techniques. In some aspects, the active depth sensing systems and techniques can include a system that incorporates time-of-flight (ToF), sparse ToF (sToF), and structured light (SL) techniques into a single device. As used herein, the terms "ToF system" and "conventional ToF system" can refer to an indirect time-of-flight (iToF) system. In some cases, the iToF system can include illuminating a scene with a diffused light active illumination. ToF systems generally produce higher resolution depth information than SL systems and the sToF system. In some cases, ansToF system can include illuminating a scene with dots that are either random, pseudo random, structured, or periodic grids. However, the depth information generated by conventional ToF systems often suffers from image artifacts induced by multipath interference (MPI). On the other hand, depth information generated by SL systems is relatively unaffected by MPI. In some cases, the depth information degenerated by the sToF may suffer less MPI and/or a correctable amount of MPI relative to the conventional ToF system.

In some aspects of the present disclosure, an active depth sensing system may combine the advantages of ToF (e.g., higher resolution), SL (e.g., no MPI), and/or spot ToF (e.g., reduced MPI with moderate resolution. For example, the present embodiments disclose a mixed depth sensing system configured to operate in a mixed depth sensing mode. In one example, the system may determine SL information for an object or scene and utilize the SL information to mitigate the effects of MPI when determining ToF depth information (e.g., ToF information, spot ToF information, and/or any combination thereof) for the object or scene. In another example, the mixed depth sensing system may determine spot ToF information for an object or scene and utilize the spot ToF information to mitigate the effects of MPI when determining ToF depth information for the object or scene. The system may include a composite sensor, a hybrid emitter, and/or a programmable architecture, thus saving device space and requiring fewer device components than a conventional ToF system (or a system supporting ToF, spot ToF, and SL modes) while also improving the speed and accuracy at which the system generates depth information.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

FIG. 1 shows a block diagram of an example mixed depth sensing system 100 configured for active depth sensing using ToF, spot ToF and/or SL techniques. It will be understood that ToF, spot ToF, and SL are example active depth techniques and that the mixed depth sensing system 100 may use other active depth techniques in some implementations. In some examples, the mixed depth sensing system 100 may be configured to generate high-resolution depth information using ToF techniques while using spot ToF and/or SL techniques to mitigate the effects of MPI in the depth information. The mixed depth sensing system 100 may include or be coupled to one or more emitters 101, one or more sensors 102, one or more processors 104, a memory 106 storing instructions 108, and an active depth controller 110 (which may include one or more signal processors 112). The one or more emitters 101 may include or be coupled to a diffractive optical element (DOE) 105. The DOE 105 may optionally be included in or coupled to the mixed depth sensing system 100. The one or more emitters 101 may include or be coupled to a diffuser 107. The diffuser 107 may optionally be included in or coupled to the mixed depth sensing system 100. For purposes of discussion herein, the mixed depth sensing system 100 may be referred to as a "mixed depth sensing system." Further for purposes of discussion herein, the "mixed depth sensing system" may instead refer to just one or more components of the mixed depth sensing system 100 (e.g., the active depth controller 110, the one or more emitters 101, the sensor 102, the DOE 105, and/or the diffuser 107) and/or any other components that may be used for active depth sensing. In some implementations, the device may be a wireless communication device.

In some embodiments, the one or more emitters 101 may be a single, hybrid laser projector capable of switching between projecting a first distribution of light (e.g., with use of the diffuser 107) during a first projection mode (e.g., a ToF projection mode) of the one or more emitters 101, projecting a second distribution of light (e.g., with use of the DOE 105) during a second projection mode (e.g., a SL projection mode) of the one or more emitters 101, and/or projecting a third distribution of light (e.g., a spot ToF projection mode) of the one or more emitters 101. When operating in the SL projection mode, the DOE 105 may enable the one or more emitters 101 to transmit the second distribution of light, which may be, for example, a known DOE dot pattern, a codeword DOE projection, a random dot projection or distribution, or the like. Similarly, when operating in the spot ToF projection mode, the DOE 105 may enable the one or more emitters 101 to transmit the third distribution of light, which may be, for example, a known DOE dot pattern, a codeword DOE projection, a random dot projection or distribution, or the like. The diffuser 107 may be switchable such that the diffuser is "off" (or "disabled" or "switched off") when the mixed depth sensing system 100 operates in the SL projection mode and/or the spot ToF projection mode and is "on" (or "enabled" or "switched on") when the mixed depth sensing system 100 operates in the ToF projection mode. More specifically, when operating in the ToF projection mode, the diffuser 107 is switched on, which causes the one or more emitters 101 to transmit the second distribution of light (e.g., diffuse distribution). In some cases, the one or more emitters 101 may be synchronized to project a first distribution of light (e.g., a diffuse distribution) during a ToF projection mode, a second distribution of light (e.g., a sparse distribution) during the SL projection mode, and a third distribution of light an additional sparse distribution) during the spot ToF projection mode.

In some embodiments, the one or more emitters 101 may include multiple projectors. For example, the one or more emitters 101 may include a first emitter can be used for operating the mixed depth sensing system 100 in the ToF projection mode and the spot ToF projection mode. In some aspects, the first emitter (e.g., with use of the DOE 105) can transmit the third distribution of light while operating in the spot ToF projection mode. In some implementations, when operating in the ToF projection mode, the first emitter can transmit the first distribution of light. In some examples, the one or more emitters 101 may include a second emitter for operating in the SL projection mode. In some cases, when the mixed depth sensing system 100 is operating in the SL projection mode, a second transmitter (e.g., with use the DOE 105 or an additional DOE (not shown)) can transmit the second distribution of light.

In some embodiments, the one or more sensors 102 may be a single, hybrid mixed depth sensor for receiving reflected light according to ToF, spot ToF, and/or SL (or "readout") modes. The sensor 102 may be configured to switch between operating in a first sensing mode (e.g., a ToF sensing mode), a second sensing mode (e.g., a SL sensing mode), and a third sensing mode (e.g., a spot ToF sensing mode). For example, the sensor 102 may be a composite CMOS image sensor configured to switch between operating in (or alternating between) the first, second, and/or third sensing modes. In some cases, the one or more sensors 102 may include a first sensor for receiving reflected light for the first sensing mode (e.g., the ToF sensing mode) and the third sensing mode (e.g., the spot ToF sensing mode). In some implementations, the one or more sensors 102 may include a second sensor for receiving light for the second sensing mode (e.g., the SL sensing mode). The sensing mode may depend on which distribution (e.g., SL, spot ToF, or diffuse) the one or more emitters 101 is projecting. In some aspects, the sensor 102 may be based on a monolithic pixel array architecture, for example, with Time-Division Multiplexed Read (TDMR) capabilities. In other embodiments, the one or more sensors 102 may include one or more generic ToF sensors operating in conjunction with multiple projectors.

In some embodiments, the active depth controller 110 may be a computation element for calculating depth information. The active depth controller 110 may be configured to compute depth information using ToF techniques (e.g., for ToF and/or spot ToF projection modes) and computing depth information using SL techniques (e.g., for SL projection mode). For purposes of discussion herein, depth information calculated using SL techniques may also be referred to as "SL depth information," "SL information," or the like. For purposes of discussion herein, depth information calculated using ToF techniques may also be referred to as "ToF depth information," "ToF information," or the like. For purposes of discussion herein, depth information calculated using spot ToF techniques may also be referred to as "spot ToF depth information," "spot ToF information," or the like. In some aspects, the active depth controller 110 may use SL depth information and/or spot ToF depth information as reference for calculating or supplementing ToF depth information, which may help compensate for MPI errors in the ToF depth information.

For example, in some implementations, the active depth controller 110 can be configured to combine ToF depth information with spot ToF depth information and/or SL depth information to compensation for MPI errors in the ToF depth information. In one illustrative example, the active depth controller 110 can determine a numerical correspondence between the ToF depth information and spot ToF depth information. As a non-limiting example, the numerical correspondence can be determined by calculating a difference between ToF depth information and spot ToF depth information. In some cases, if the difference exceeds an MPI threshold, the ToF depth information can be adjusted based on the spot ToF depth information. In one illustrative example, adjusting depth values can include interpolation between the depth information and the spot ToF information. Similarly, in some cases, the active depth controller 110 can determine a numerical correspondence between the ToF depth information and SL depth information. In some aspects, the ToF depth information can be adjusted based on the SL depth information. In another illustrative example, the active depth controller 110 can determine a numerical correspondence between the spot ToF depth information and the SL depth information. In some cases, the spot ToF depth information can be adjusted based on the SL depth information.

In some cases, one or more image fusion techniques can be used to adjust depth information obtained using two different illumination configurations. In some cases, interpolation can be used to determine an amount of adjustment. For example, depth information acquired with a sparse illumination mode (e.g., spot ToF, SL) may include depth information for a subset of pixels corresponding to the illumination pattern. In some examples, interpolation can be used to estimate the depth value in regions of the scene that are not represented in the depth information. In some implementations, a windowing technique can be used to determine which pixel(s) of the depth information from the sparse illumination mode to use as a reference for adjusting depth information of a different illumination configuration (e.g., adjusting ToF based on spot ToF and/or SL, adjusting spot ToF based on SL). In some examples, a fixed grid technique can be used to determine which pixel(s) of the depth information from the sparse illumination mode to use as a reference for adjusting depth information of a different illumination configuration (e.g., adjusting ToF based on spot ToF and/or SL, adjusting spot ToF based on SL). Although specific examples of image techniques are provided herein, other image fusion techniques can be used without departing from the scope of the present disclosure.

In some embodiments, the sensor 102 may be a Reconfigurable Instruction Cell Array (RICA), which is a proprietary, real-time, low-power, (re)programmable, image signal processing (ISP), active sensing, processing engine. In some aspects, stacking the RICA programmable implementation with the hybrid NIR sensor described herein may enable the active depth controller 110 to switch programming "on-the-fly" to compute SL depth information, spot ToF depth information, and/or ToF depth information while reducing a number of components for a sensor (e.g., the sensor 102). In other embodiments, the active depth controller 110 may be a generic sensor.

In some aspects, the active depth controller 110 may be configured to control (or otherwise operate) at least one of the one or more emitters 101 and the one or more sensors 102 to coordinate their respective operating modes, such that the one or more emitters 101 and the one or more sensors 102 operate in either their respective SL modes, spot ToF modes, and/or or ToF modes. In some aspects, the active depth controller 110 may be controlled, work in conjunction with, or otherwise be operated by one or more other components of the mixed depth sensing system 100, such as the one or more processors 104 and/or the memory 106.

The mixed depth sensing system 100 may optionally include or be coupled to a display 114 and a number of input/output (I/O) components 116. The one or more sensors 102 may be, or otherwise may be coupled to, a camera, such as a single camera, a dual camera module, or a module with any number of other camera sensors (not pictured). The signal processor 112 may be configured to process captures from the sensor 102. The mixed depth sensing system 100 may further include one or more optional sensors 120 (such as a gyroscope, magnetometer, inertial sensor, NIR sensor, and so on) coupled to the one or more processors 104. The mixed depth sensing system 100 may include additional features or components not shown.

The memory 106 may be a non-transient or non-transitory computer readable medium storing computer-executable instructions 108 to perform all or a portion of one or more operations described in this disclosure. The one or more processors 104 may be one or more suitable processors capable of executing scripts or instructions of one or more software programs (such as instructions 108) stored within the memory 106. In some aspects, the one or more processors 104 may be one or more general purpose processors that execute instructions 108 to cause the mixed depth sensing system 100 to perform any number of functions or operations. In additional or alternative aspects, the one or more processors 104 may include integrated circuits or other hardware to perform functions or operations without the use of software. While shown to be coupled to each other via the one or more processors 104 in the example of FIG. 8, the one or more processors 104, the memory 106, the active depth controller 110, the optional display 114, the optional I/O components 116, and the optional sensors 120 may be coupled to one another in various arrangements. For example, the one or more processors 104, the memory 106, the active depth controller 110, the optional display 114, the optional I/O components 116, and/or the optional sensors 120 may be coupled to each other via one or more local buses (not shown for simplicity).

The display 114 may be any suitable display or screen allowing for user interaction and/or to present items (such as depth information or a preview image of the scene) for viewing by a user. In some aspects, the display 114 may be a touch-sensitive display. The I/O components 116 may be or include any suitable mechanism, interface, or device to receive input (such as commands) from the user and to provide output to the user. For example, the I/O components 116 may include (but are not limited to) a graphical user interface, keyboard, mouse, microphone and speakers, squeezable bezel or border of the mixed depth sensing system 100, physical buttons located on mixed depth sensing system 100, and so on. The display 114 and/or the I/O components 116 may provide a preview image or depth information for the scene to a user and/or receive a user input for adjusting one or more settings of the mixed depth sensing system 100 (such as adjusting an intensity of emissions by one or more emitters 101, determining or switching one or more operating modes of the mixed depth sensing system 100, adjusting a field of emission of the one or more emitters 101, and so on).

The active depth controller 110 may include, or may otherwise be coupled to, a signal processor 112, which may be one or more processors to process depth information from the one or more sensors 102. The active depth controller 110 may be configured to switch at least one or more of the one or more emitters 101 or at least one of the one or more sensors 102 between one or more operating modes. The active depth controller 110 may alternatively or additionally include a combination of specific hardware and the ability to execute software instructions.

The one or more emitters 101 may vary a field of emission for different operating modes. In some example implementations, the one or more emitters 101 may include a focusing apparatus for adjusting the size of the field of emission/transmission. In one example, mirrors attached to actuators (such as microelectromechanical systems (MEMS) actuators) may adjust the focus of the light emissions from the one or more emitters 101. In another example, an adjustable holographic optical element (HOE) may adjust the focus of the light emissions from the one or more emitters 101. In a further example, a formable DOE (such as a piezoelectric material to adjust the shape) may be adjusted to focus the diffracted points of light emitted.

In some other example implementations, the mixed depth sensing system 100 may emit light using a plurality of light emitters (not shown) instead of, or in combination with, the one or more emitters 101. The emitters may include a first group of light emitters (e.g., of a first array of light emitters) for emitting light with a first field of transmission. The emitters may further include a second or different group of light emitters (e.g., of a second array of light emitters) for emitting light with a second field of transmission. The first field may be larger than the second field at a common depth from the one or more emitters 101. In some example implementations, the first group of light emitters may be active for a first mode of the one or more emitters 101 and a third mode of the one or more emitters 101, and the second group of light emitters may be active for a second mode of the one or more emitters 101.

Figure 2:
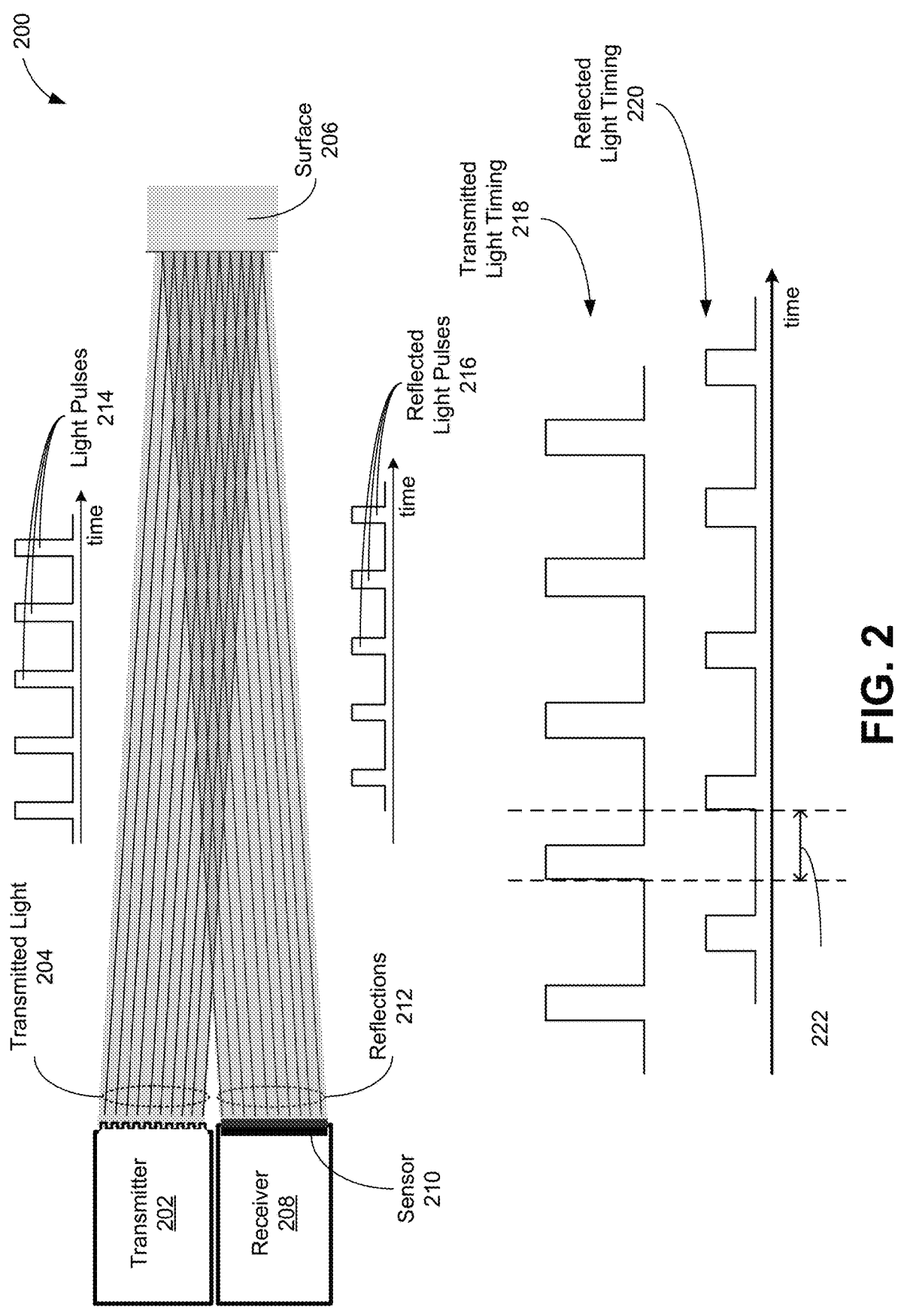
FIG. 2 illustrates an example time of flight (ToF) system, in accordance with some examples of the present disclosure.

FIG. 2 shows an example ToF system 200. The ToF system 200 may be used to generate depth information of a scene including a surface 206, or may be used for other applications for ranging surfaces or other portions of the scene. The ToF system 200 may include a transmitter 202 and a receiver 208. The transmitter 202 may be referred to as a "light projector," "transmitter," "projector," "emitter," and so on, and should not be limited to a specific transmission component. Similarly, the receiver 208 may be referred to as a "light sensor," "detector," "sensor," "sensing element," "photodetector," and so on, and should not be limited to a specific receiving component.

The transmitter 202 may be configured to transmit, emit, or project signals (such as a field of light) onto the scene. While ToF systems are described in the examples as emitting light (which may include near-infrared (NIR)), signals at other frequencies may be used, such as short-wavelength infrared (SWIR), microwaves, radio frequency signals, sound, and so on. The present disclosure should not be limited to a specific range of frequencies for the emitted signals.

In some cases, the configuration of the ToF system 200 can be used for direct Time of Flight (dToF) measurements. In some examples, a dToF transmitter 202 transmits light 204 toward a scene including a surface 206. In some cases, the transmitted light 204 includes light pulses 214 at known time intervals (such as at a regular time interval). In some cases, a dToF receiver 208 includes a sensor 210 to sense the reflections 212 of the transmitted light 204. In some cases, the reflections 212 include the reflected light pulses 216, and the ToF system 200 determines a round trip time 222 for the light by comparing the timing 218 of the transmitted light pulses to the timing 220 of the reflected light pulses 216. In dToF measurements, the distance of the surface 206 from the ToF system 200 may be calculated to be half the round trip time multiplied by the speed of the emissions (such as the speed of light for light emissions).

In some cases, the ToF system 200 (e.g., transmitter 202, receiver 208, sensor 210) can be used for indirect time-of-flight (iToF) measurements. In some cases, round trip time 222 for iToF measurements can be deduced by measuring the phase shift between the reflected light and the transmitted light as illustrated with respect to FIG. 3A through FIG. 3C below.

The sensor 210 may include an array of photodiodes to measure or sense the reflections. Alternatively, the sensor 210 may include a CMOS sensor or other suitable photosensitive sensor including a number of pixels or regions for sensing. The ToF system 200 identifies the reflected light pulses 216 as sensed by the sensor 210 when the magnitudes of the pulses are greater than a value. For example, the ToF system 200 measures a magnitude of the ambient light and other interference without the signal and determines if further measurements are greater than the previous measurement by a value.

FIG. 3A shows an example ToF system 320 including an emitter 325 and a sensor 330. The emitter 325 transmits light pulses toward an object 335, and the light pulses are reflected back by the object 335 toward the sensor 330. The light reflected back to the sensor 330 may have a different phase than the light emitted from the emitter 325. FIG. 3B shows an example sensor pixel 340 that may be included, for example, in the sensor 230. The sensor pixel 340 includes a photodiode 342 for converting photons from the reflected light into electrical current. The sensor pixel 340 may also include one or more capacitors (e.g., C1 and C2) to store energy from the current. The ToF system 320 may calculate a distance between the ToF system 320 and the object 335 in part by comparing the voltages (e.g., V0 and V180) with their corresponding phases (e.g., Φ0 and Φ180, respectively).

FIG. 3C shows a pulse diagram 360 illustrating a pulsed signal emitted from the emitter 325 and a corresponding reflection of the pulsed signal (e.g., reflected by an object, such as the object 235 of FIG. 3A) received at the sensor 330. The reflected signal is phase-delayed relative to the pulsed signal. The ToF system 320 may open and close a shutter to expose the sensor 330 at a number of particular phase offsets (e.g., Phase 0°, Phase 180°, Phase 90°, and Phase 270°) relative to the pulsed signal. During each exposure cycle (shaded in gray), electrical charge may be stored by one or more storage elements, such as by capacitors C1 and C2 of FIG. 3B. For example, during a first exposure cycle, C1 may store a charge (Q1) and C2 may store a charge (Q2), where Q1 is the accumulated charge from the reflected signal when the shutter is open at the 0° phase offset, and where Q2 is the accumulated charge from the reflected signal when the shutter is open at the 180° phase offset. During a second exposure cycle, C1 may store a charge (Q3) and C2 may store a charge (Q4), where Q3 is the accumulated charge from the reflected signal when the shutter is open at the 90° phase offset, and where Q4 is the accumulated charge from the reflected signal when the shutter is open at the 270° phase offset. The ToF system 320 can calculate the phase offset (φ) between the pulsed signal and the reflected signal based on the charges stored across C1 and C2 for each of the exposure cycles:

$$\varphi = \tan^{-1}\frac{Q3 - Q4}{Q1 - Q2}$$

The calculated phase offset between the pulsed signal and the reflected signal is proportional to the distance between the corresponding sensor pixel (such as the sensor pixel 340) and the object 335:

$$d = \left(\frac{c}{2f}\right) * \left(\frac{\varphi}{2\pi}\right)$$

where c is the speed of light and f is the frequency of the modulated signal. Based on the determined distances from each pixel of the sensor 330 to the object 335, the ToF system 320 may generate depth information for the object in the scene.

Figure 4:
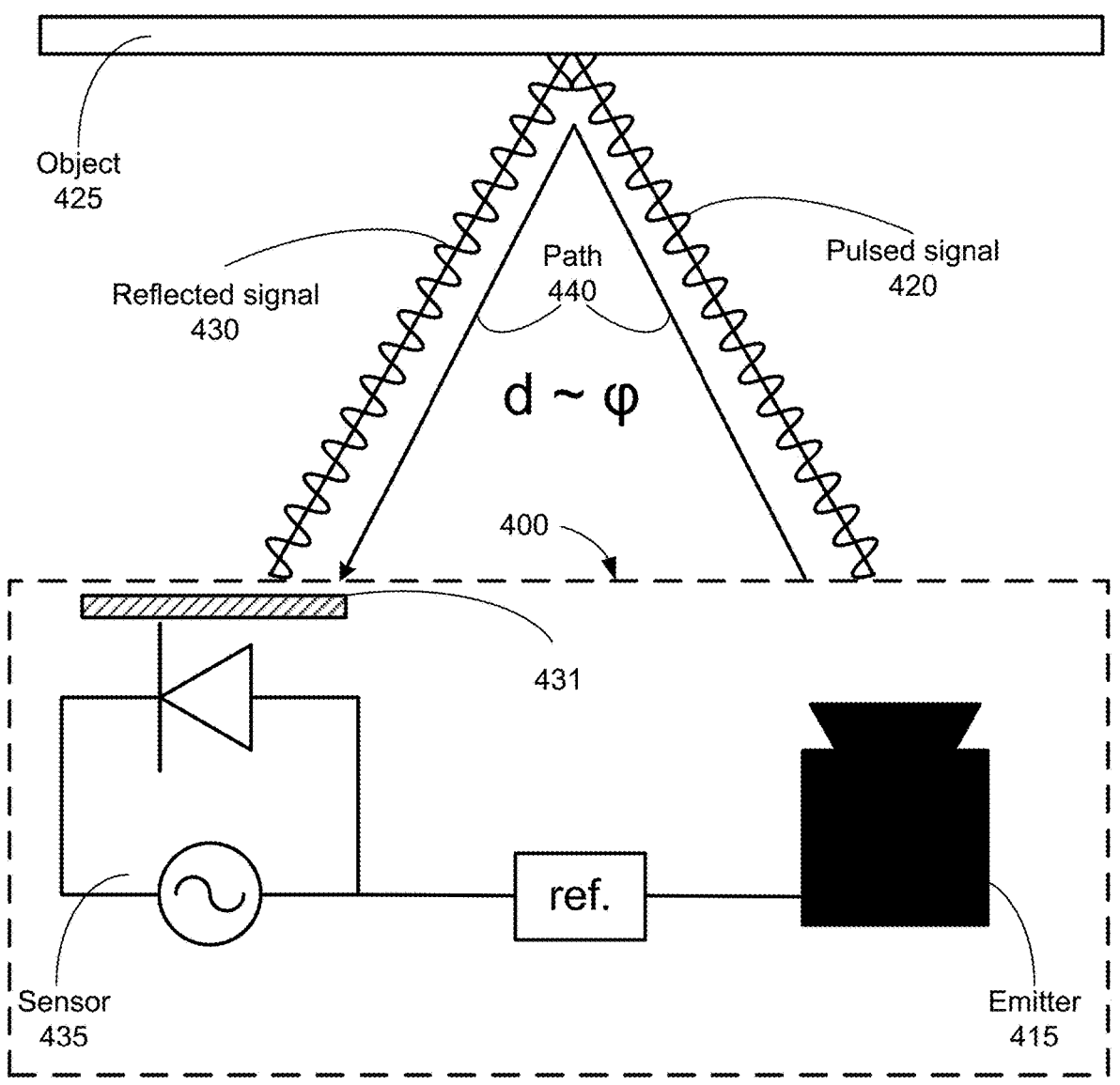
FIG. 4 is a block diagram illustrating an example ToF system, in accordance with some examples of the present disclosure.

FIG. 4 shows an example ToF system 400. The ToF system 400 includes an emitter 415 and a sensor 435. The emitter 415 pulses a signal 420 toward an object 425, and the sensor 435 receives a corresponding reflected signal 430. The pulsed signal 420 may be a modulated continuous-wave (AMCW) pulse of light. As described in connection with FIG. 3C, the ToF system 400 may determine a distance from one or more pixels of the sensor 435 based on a proportional correlation to the phase difference between the pulsed signal 420 and the reflected signal 430. The pulsed signal 420 and the reflected signal 430 may follow a direct path 440. In some implementations, the ToF system 400 can include a band-pass filter 431 positioned between the path of the reflected signal 430 and the sensor 435. In some cases, the band-pass filter 431 can filter out (e.g., attenuate) ambient light while allowing light at the wavelength of the emitter 415 to pass through. In one illustrative example, the band-pass filter 431 can have a pass bandwidth between 10 nm and 50 nm.

Some environments (e.g., with corners, convex areas, and/or reflective surfaces) may cause different pulses of light to arrive at the ToF system sensor along multiple reflection paths and recombine at the sensor, which is known as MPI. For purposes of discussion herein, MPI may also be referred to as "multipath effects" or "MPI effects." MPI may cause the ToF system to overestimate the amount of charge being accumulated for one or more phase offsets of the corresponding pulsed signal. The overestimation may cause the ToF system to inaccurately calculate the corresponding phase shift between the pulsed and reflected signals. Thus, the ToF system may inaccurately calculate the corresponding distance from one or more of the sensor pixels to the object or scene, which may cause distortions (or "bumps") in corresponding depth information.

Figures 5A, 5B, 5C:
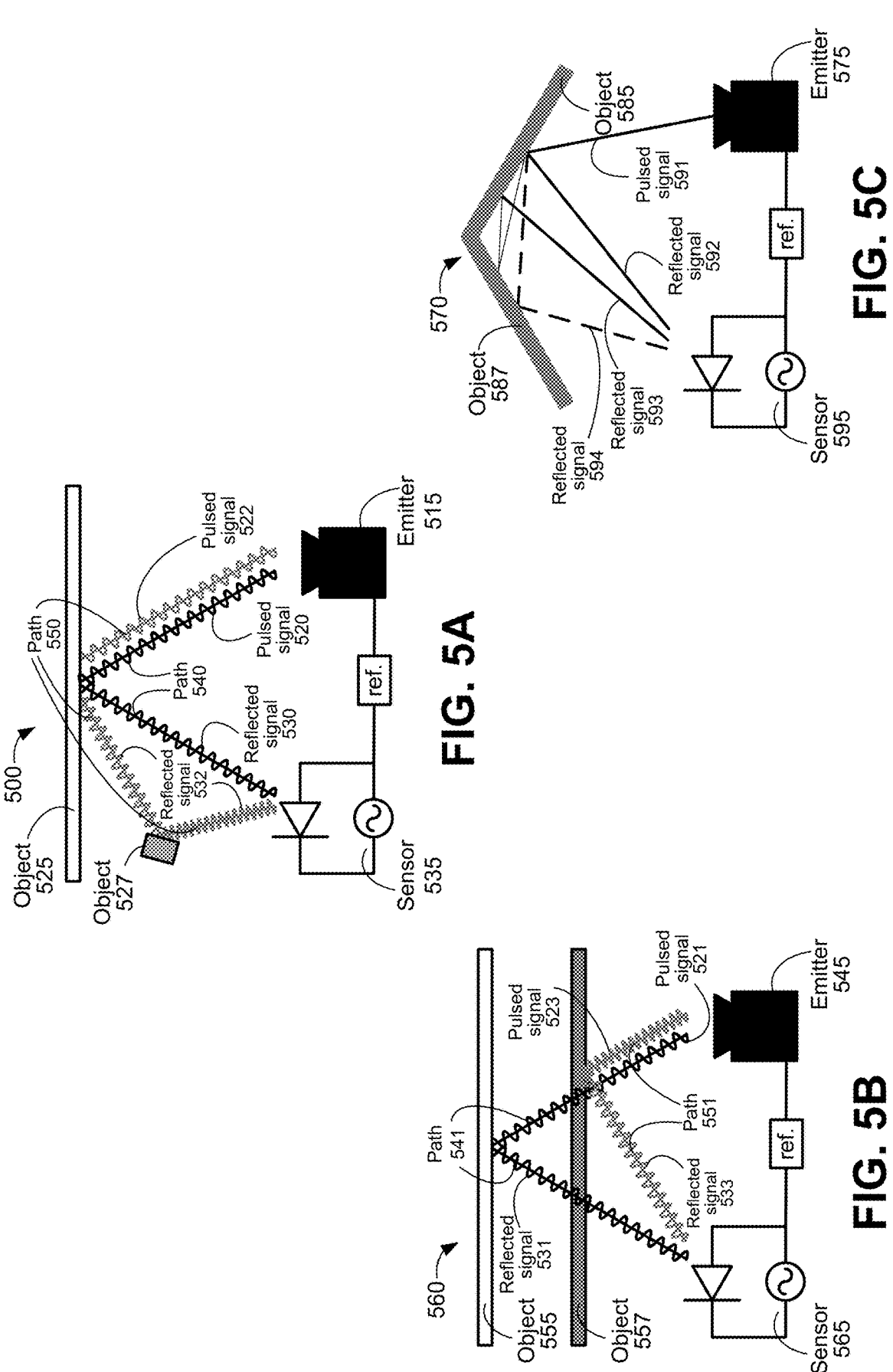
FIG. 5A illustrates an example environment in which multipath interference (MPI) may affect ToF depth sensing, in accordance with some examples of the present disclosure.
FIG. 5B illustrates another example environment in which MPI may affect ToF depth sensing, in accordance with some examples of the present disclosure.
FIG. 5C illustrates another example environment in which MPI may affect ToF depth sensing, in accordance with some examples of the present disclosure.

FIG. 5A shows an example environment 500 in which MPI may affect ToF depth sensing. The ToF system includes an emitter 515 and a sensor 535. The scene includes an object 525 and an object 527. The object 527 may have a mirror-like surface. The emitter 515 transmits a pulsed signal 520 and a pulsed signal 522 toward the object 525. The sensor 535 receives corresponding reflected signal 530 and reflected signal 532, respectively. Similar to the pulsed signal 420 and the reflected signal 430 of FIG. 4, the pulsed signal 520 and the reflected signal 530 follow a direct path 540. In contrast, the pulsed signal 522 and the reflected signal 532 follow an indirect path 550 (e.g., reflecting off of the object 527) such that the reflected signal 532 may arrive at the sensor 535 at the same time as the reflected signal 530, causing MPI.

FIG. 5B shows another example environment 560 in which MPI may affect ToF depth sensing. The ToF system includes an emitter 545 and a sensor 565. The scene includes an object 555 and an object 557. The object 557 may have a semi-transparent surface. The emitter 545 transmits a pulsed signal 521 and a pulsed signal 523. The sensor 565 receives corresponding reflected signal 531 and reflected signal 533, respectively. The pulsed signal 521 and the reflected signal 531 follow path 541 (e.g., reflecting off of the object 555). The pulsed signal 523 and the reflected signal 533 follow path 551 (e.g., reflecting off of the object 557). The reflected signal 533 may arrive at the sensor 565 at the same time as the reflected signal 531, causing MPI.

FIG. 5C shows another example environment 570 in which MPI may affect ToF depth sensing. The ToF system includes an emitter 575 and a sensor 595. The scene includes an object 585 and an object 587, which may represent two walls that intersect at a corner point. The emitter 575 transmits a pulsed signal 591 toward the object 585, and the sensor 595 receives the corresponding reflected signal 592. In addition, possibly due to the reflective properties of the object 585 or the object 587, reflected signal 593 and reflected signal 594 may arrive at the sensor 595 at the same time as the reflected signal 592, causing MPI.

Figure 6B:
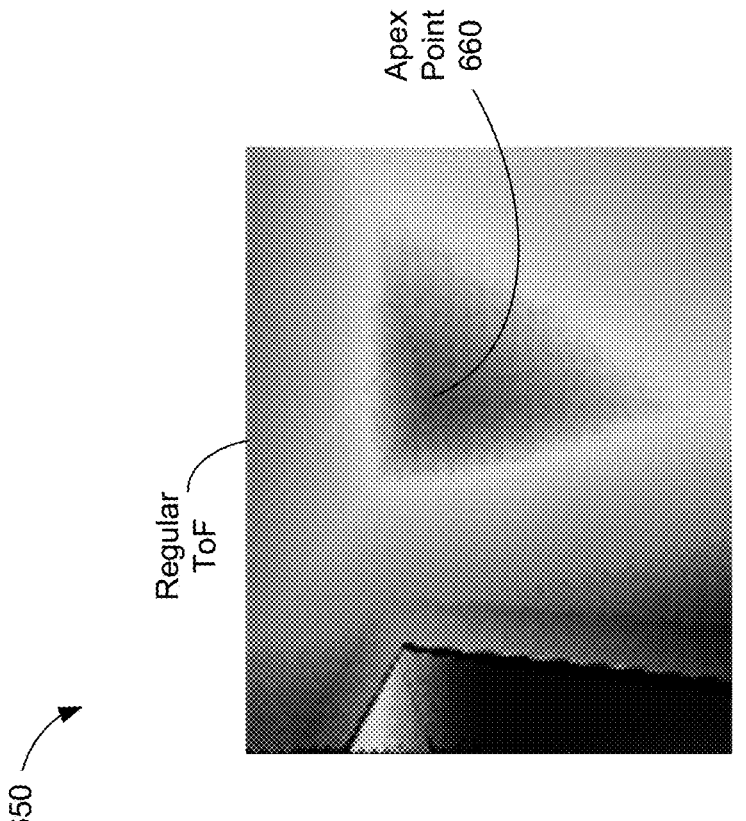
FIG. 6B illustrates an example depth map of the scene from FIG. 5A as generated by a conventional ToF system, in accordance with some examples of the present disclosure.
Figure 6A:
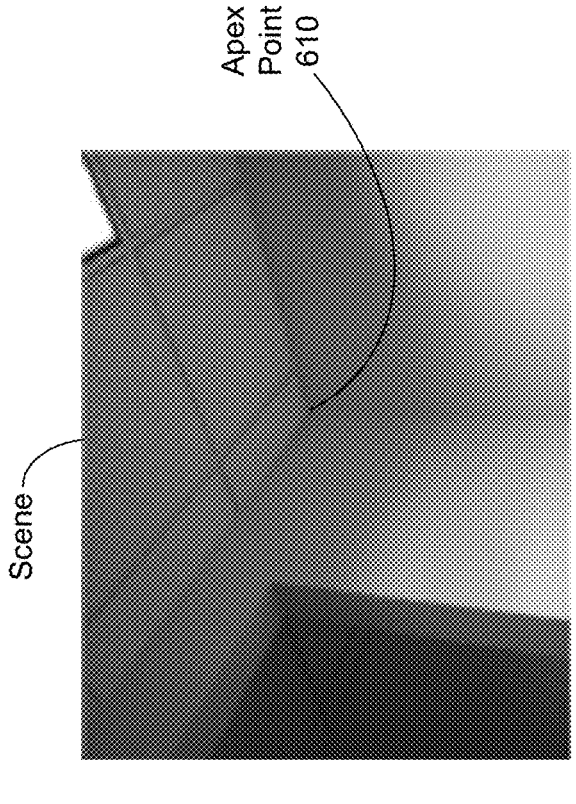
FIG. 6A illustrates an example scene including a corner of a room with an apex point where two of the walls intersect with the ceiling, in accordance with some examples of the present disclosure.

FIG. 6A shows an example scene 600 including a corner of a room with an apex point 610 where two of the walls intersect with the ceiling. It will be understood that the apex point 610 is the furthest point (e.g., the point having the highest z-distance) from the sensor of the ToF system. FIG. 6B shows an example depth map 650 of the scene from FIG. 6A as generated by a conventional ToF system ("regular ToF"). However, similar to the example environment 570 of FIG. 5C, multiple reflected signals may arrive at the sensor (e.g., due to the corner of the room with apex point 660), causing MPI. A conventional ToF system may superimpose the multiple reflected signals, ultimately resulting in the corresponding region in the depth map 650 appearing to have a uniform depth.

Figure 7:
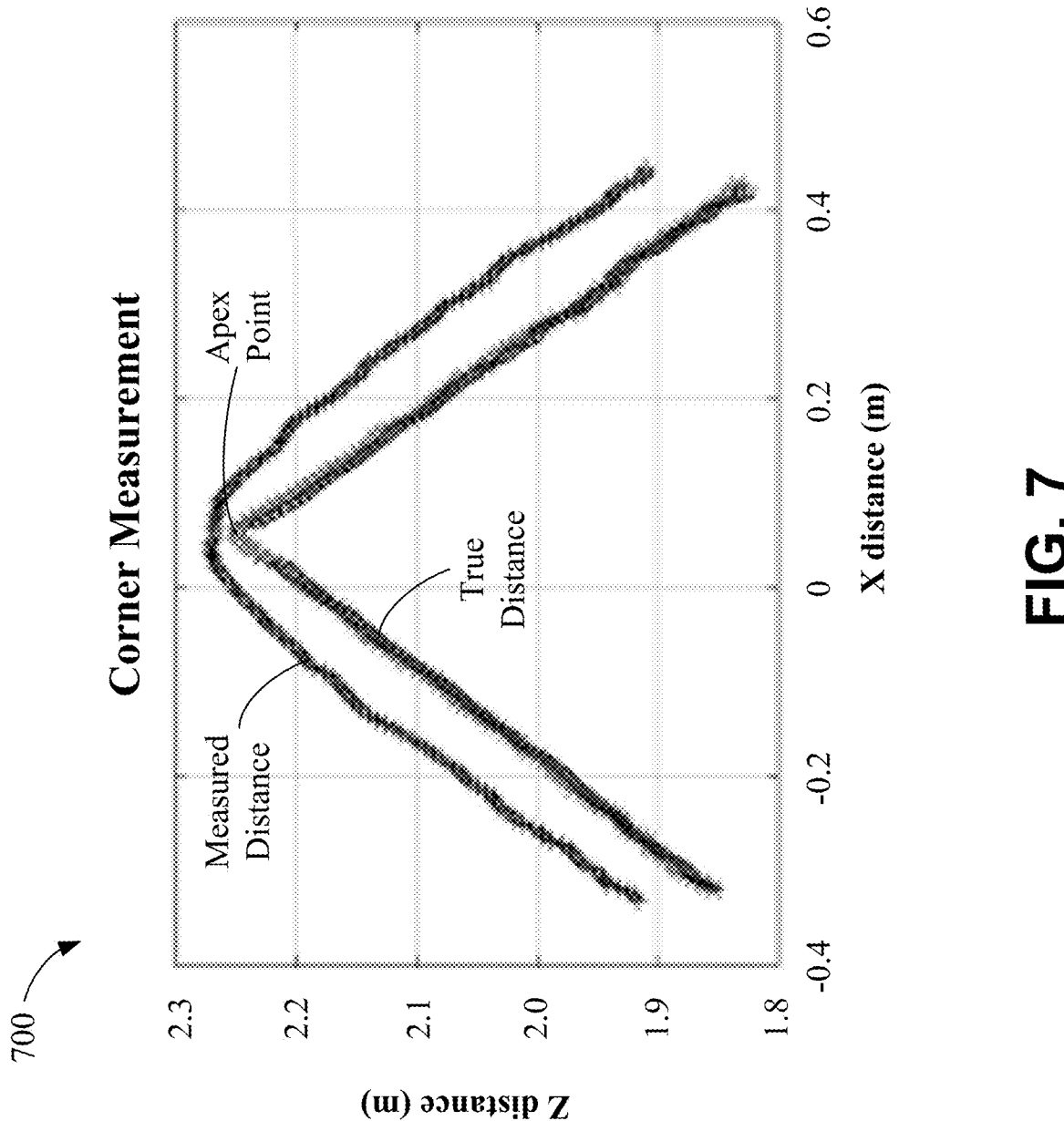
FIG. 7 illustrates a graph of the corresponding X-distance and Z-distance for the scene of FIG. 6A, in accordance with some examples of the present disclosure.

To illustrate, FIG. 7 shows a graph 700 of a corresponding X-distance as measured by a ToF system and a corresponding Z-distance as measured by a ToF system for the scene 600 of FIG. 6A. The x-distance may represent a horizontal distance (in meters, m) from the center of the scene at 0 m. The z-distance may represent a depth distance from the sensor of the ToF system to an object in the scene, such as a surface of a wall. The bottom plot represents the actual ("true") x-distance and z-distance for the corner, while the top plot represents the distance measured by the ToF system. The true distance plot accurately shows the apex point of the corner of the room, which comes to a sharp point. The measured distance plot depicts the apex point as a bowl-like curve. This inaccurate measurement yields incorrect distance calculations, such as shown in the depth map 650 of FIG. 6B.

Figure 8:
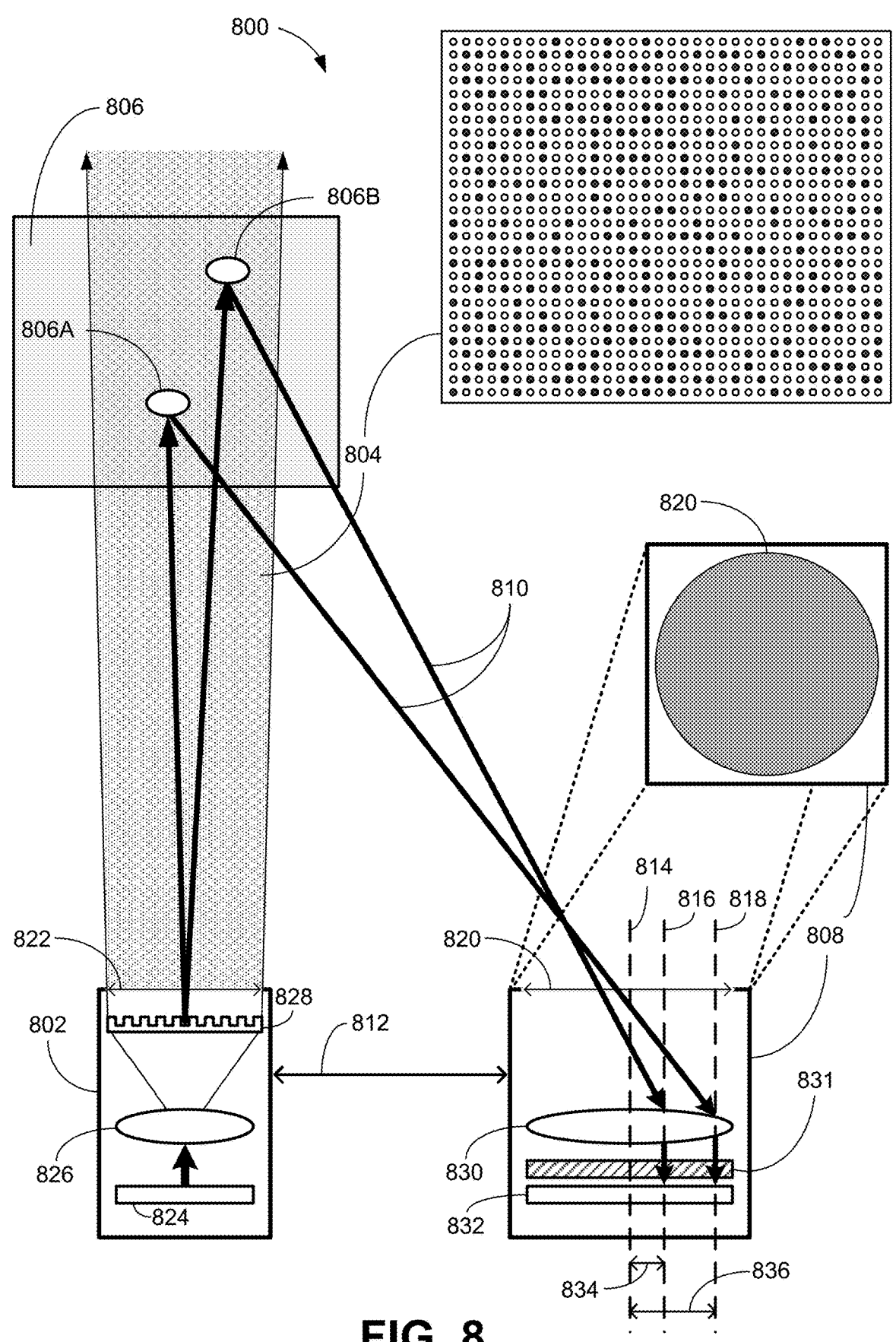
FIG. 8 illustrates an example structured light (SL) system, in accordance with some examples of the present disclosure.

FIG. 8 shows an example SL system 800. As described above, SL is relatively unaffected by MPI and generally produces lower (more sparse) resolution depth information than ToF systems (e.g., the ToF system 200 of FIG. 2). A SL system may transmit light in a distribution of points (or another suitable shape of focused light). For purposes of discussion herein, the distribution of points may be referred to as a "pattern," a "SL pattern," a "dot pattern," or the like, and the pattern may be predefined or random. The points of light may be projected on to a scene, and the reflections of the points of light may be received by the SL system. Depths of objects in a scene may be determined by comparing the pattern of the received light and the pattern of the transmitted light, or by comparing the pattern of the received light and the pattern of the received light reflected from a known distance via a calibration process. In comparing the patterns, a portion of the predefined distribution for the transmitted light may be identified in the received light. A SL system may project a distribution of light (such as a distribution of light points or other shapes) using a structured light projector.

The light distribution emitted by a SL projector may not change. Denser distributions of light (such as additional light points or more instances of focused light in an area than for sparser distributions of light) may result in a higher lateral resolution of depth measurements. For example, a denser light distribution can resolve objects that are closer together than a sparser distribution of light can resolve. However, the intensity of individual light points are lower for denser distributions than for sparser distributions where the overall intensity is similar between the distribution. As a result, ambient light interference may cause identifying reflections of a denser distribution of light to be more difficult than for sparser distributions of light. For example, a SL projector may project IR light (such as NIR light) with a 850 nanometer (nm), 905 nm, or 940 nm wavelength (or other suitable wavelength). A SL receiver may receive reflections of the IR light as well as sunlight and other ambient light. Ambient light may cause interference of the IR light points. As a result, brightly lit scenes (such as outdoor scenes in daylight) may cause more interference than darker scenes (such as indoor scenes or nighttime scenes) because of the additional ambient light being captured by the SL receiver.

The SL system 800 (which herein may also be called a SL system) may be used to generate depth information for a scene 806. For example, the scene 806 may include a face, and the SL system 800 may be used for identifying or authenticating the face. The SL system 800 may include a transmitter 802 and a receiver 808. The transmitter 802 may be referred to as a "transmitter," "projector," "emitter," and so on, and should not be limited to a specific transmission component. Throughout the following disclosure, the terms projector and transmitter may be used interchangeably. The receiver 808 may be referred to as a "detector," "sensor," "sensing element," "photodetector," and so on, and should not be limited to a specific receiving component.

While the disclosure refers to the distribution as a light distribution, any suitable signals at other frequencies may be used (such as radio frequency waves, sound waves, etc.). Further, while the disclosure refers to the distribution as including a plurality of light points, the light may be focused into any suitable size and dimensions. For example, the light may be projected in lines, squares, or any other suitable dimension. In addition, the disclosure may refer to the distribution as a codeword distribution, where a defined portion of the distribution (such as a predefined patch of light points) is referred to as a codeword. If the distribution of the light points is known, the codewords of the distribution may be known. However, the distribution may be organized in any way, and the present disclosure should not be limited to a specific type of distribution or type of signal or pulse.

The transmitter 802 may be configured to project or transmit a distribution 804 of light points onto the scene 806. The white circles in the distribution 804 may indicate where no light is projected for a possible point location, and the black circles in the distribution 804 may indicate where light is projected for a possible point location. In some example implementations, the transmitter 802 may include one or more light sources 824 (such as one or more lasers), a lens 826, and a light modulator 828. The transmitter 802 may also include an aperture 822 from which the transmitted light escapes the transmitter 802. In some implementations, the transmitter 802 may further include a diffractive optical element (DOE) to diffract the emissions from one or more light sources 824 into additional emissions. In some aspects, the light modulator 828 (to adjust the intensity of the emission) may include a DOE. In projecting the distribution 804 of light points onto the scene 806, the transmitter 802 may transmit one or more lasers from the light source 824 through the lens 826 (and/or through a DOE or light modulator 828) and onto the scene 806. The transmitter 802 may be positioned on the same reference plane as the receiver 808, and the transmitter 802 and the receiver 808 may be separated by a distance called the baseline (812).

In some example implementations, the light projected by the transmitter 802 may be IR light. IR light may include portions of the visible light spectrum and/or portions of the light spectrum that is not visible to the naked eye. In one example, IR light may include NIR light, which may or may not include light within the visible light spectrum, and/or IR light (such as far infrared (FIR) light) which is outside the visible light spectrum. The term IR light should not be limited to light having a specific wavelength in or near the wavelength range of IR light. Further, IR light is provided as an example emission from the transmitter. In the following description, other suitable wavelengths of light may be used. For example, light in portions of the visible light spectrum outside the IR light wavelength range or ultraviolet light. Alternatively, other signals with different wavelengths may be used, such as microwaves, radio frequency signals, and other suitable signals.

The scene 806 may include objects at different depths from the SL system (such as from the transmitter 802 and the receiver 808). For example, objects 806A and 806B in the scene 806 may be at different depths. The receiver 808 may be configured to receive, from the scene 806, reflections 810 of the transmitted distribution 804 of light points. To receive the reflections 810, the receiver 808 may capture an image. When capturing the image, the receiver 808 may receive the reflections 810, as well as (i) other reflections of the distribution 804 of light points from other portions of the scene 806 at different depths and (ii) ambient light. Noise may also exist in the captured image.

In some example implementations, the receiver 808 may include a lens 830 to focus or direct the received light (including the reflections 810 from the objects 806A and 806B) on to the sensor 832 of the receiver 808. The receiver 808 may also include an aperture 820. In some cases, the receiver 808 may include a band-pass filter 831. For example, FIG. 8 illustrates a band-pass filter 831 positioned between the lens 830 and sensor 832. In some cases, the band-pass filter 831 can be placed between the aperture 820 and the lens 830. In some cases, the band-pass filter 831 can filter out (e.g., attenuate) ambient light while allowing light at the wavelength of the light source 824 to pass through. In one illustrative example, the band-pass filter 831 can have a pass bandwidth between 10 nm and 50 nm. Assuming for the example that only the reflections 810 are received, depths of the objects 806A and 806B may be determined based on the baseline 812, displacement and distortion of the light distribution 804 (such as in codewords) in the reflections 810, and intensities of the reflections 810. For example, the distance 834 along the sensor 832 from location 816 to the center 814 may be used in determining a depth of the object 806B in the scene 806. Similarly, the distance 836 along the sensor 832 from location 818 to the center 814 may be used in determining a depth of the object 806A in the scene 806.

The distance along the sensor 832 may be measured in terms of number of pixels of the sensor 832 or a distance (such as millimeters).

In some example implementations, the sensor 832 may include an array of photodiodes (such as avalanche photodiodes) for capturing an image. To capture the image, each photodiode in the array may capture the light that hits the photodiode and may provide a value indicating the intensity of the light (a capture value). The image therefore may be the capture values provided by the array of photodiodes.

In addition or alternative to the sensor 832 including an array of photodiodes, the sensor 832 may include a complementary metal-oxide semiconductor (CMOS) sensor. To capture the image by a photosensitive CMOS sensor, each pixel of the sensor may capture the light that hits the pixel and may provide a value indicating the intensity of the light. In some example implementations, an array of photodiodes may be coupled to the CMOS sensor. In this manner, the electrical impulses generated by the array of photodiodes may trigger the corresponding pixels of the CMOS sensor to provide capture values.

The sensor 832 may include at least a number of pixels equal to the number of possible light points in the distribution 804. For example, the array of photodiodes or the CMOS sensor may include a number of photodiodes or a number of pixels, respectively, corresponding to the number of possible light points in the distribution 804. In some cases, the sensor 832 can include a number of photodiodes or a number of pixels greater than (e.g., ten times greater, 100 times greater, 1000 times greater, or any other suitable number of photodiodes or pixels) the number of possible light points of the distribution 804. In some cases, the light points reflected by a scene can be detected by multiple photodiodes or pixels of the sensor 832. The sensor 832 logically may be divided into groups of pixels or photodiodes (such as 4×4 groups) that correspond to a size of a bit of a codeword. The group of pixels or photodiodes may also be referred to as a bit, and the portion of the captured image from a bit of the sensor 832 may also be referred to as a bit. In some example implementations, the sensor 832 may include the same number of bits as the distribution 804.

If the light source 824 transmits IR light (such as NIR light at a wavelength of, e.g., 940 nm), the sensor 832 may be an IR sensor to receive the reflections of the NIR light. The sensor 832 may also be configured to capture an image using a flood illuminator (not illustrated). As illustrated, the distance 834 (corresponding to the reflections 810 from the object 806B) is less than the distance 836 (corresponding to the reflections 810 from the object 806A). Using triangulation based on the baseline 812 and the distances 834 and 836, the differing depths of objects 806A and 806B in the scene 806 may be determined in generating depth information for the scene 806. Determining the depths may further include determining a displacement or a distortion of the distribution 804 in the reflections 810.

Although multiple separate components are illustrated in FIG. 8, one or more of the components may be implemented together or include additional functionality. All described components may not be required for a SL system 800, or the functionality of components may be separated into separate components. Additional components not illustrated may also exist. For example, the receiver 808 may include a bandpass filter to allow signals having a determined range of wavelengths to pass onto the sensor 832 (thus filtering out signals with a wavelength outside of the range). In this manner, some incidental signals (such as ambient light) may be prevented from interfering with the captures by the sensor 832. The range of the bandpass filter may be centered at the transmission wavelength for the transmitter 802. For example, if the transmitter 802 is configured to transmit NIR light with a wavelength of 940 nm, the receiver 808 may include a bandpass filter configured to allow NIR light having wavelengths within a range of, e.g., 800 nm to 960 nm. Therefore, the examples described regarding FIG. 7 are for illustrative purposes, and the present disclosure should not be limited to the example SL system 800.

For a light projector (such as the transmitter 802), the light source may be any suitable light source. In some example implementations, the light source 824 may include one or more distributed feedback (DFB) lasers. In some other example implementations, the light source 824 may include one or more vertical-cavity surface-emitting lasers (VC-SELs).

A DOE is a material situated in the projection path of the light from the light source. The DOE may be configured to split a light point into multiple light points. For example, the material of the DOE may be a translucent or a transparent polymer with a known refractive index. The surface of the DOE may include peaks and valleys (varying the depth of the DOE) so that a light point splits into multiple light points when the light passes through the DOE. For example, the DOE may be configured to receive one or more lights points from one or more lasers and project an intended distribution with a greater number of light points than emitted by the one or more lasers. While the Figures may illustrate the depth of a DOE changing along only one axis of the DOE, the Figures are only to assist in describing aspects of the disclosure. The peaks and valleys of the surface of the DOE may be located at any portion of the surface of the DOE and cause any suitable change in the depth of portions of the DOE, and the present disclosure should not be limited to a specific surface configuration for a DOE.

If the light source 824 includes an array of lasers (such as a VCSEL array), a portion of the distribution of light points may be projected by the array. A DOE may be used to replicate the portion in projecting the distribution of light points. For example, the DOE may split the projection from the array into multiple instances, and a pattern of the projection may be a repetition of the projection from the array. In some example implementations, the DOE may be configured to repeat the projection vertically, horizontally, or at an angle between vertical and horizontal relative to the projection. The repeated instances may be overlapping, non-overlapping, or any suitable configuration. While the examples describe a DOE configured to split the projection from the array and stack the instances above and below one another, the present disclosure should not be limited to a specific type of DOE configuration and repetition of the projection.

Figure 9A:
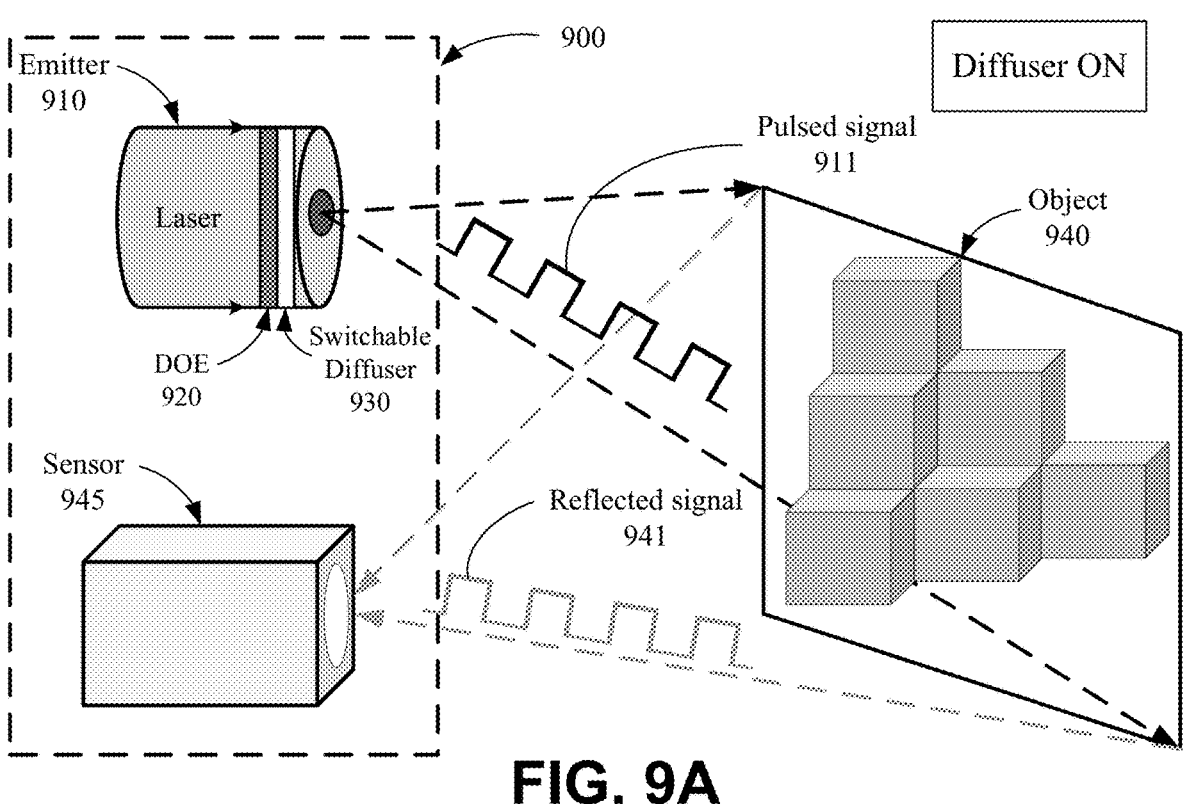
FIG. 9A illustrates an example mixed depth sensing system operating in a first mode, in accordance with some examples of the present disclosure.

FIG. 9A shows an example mixed depth sensing system 900 operating in a first (e.g., ToF) mode. For example, the mixed depth sensing system 900 can correspond to the mixed depth sensing system 100 of FIG. 1. In some aspects, the diffuser 930 may be a switchable diffuser, such as described above with respect to the diffuser 107 of FIG. 1. The emitter 910 and the sensor 945 may be examples of the one or more emitters 101 and the one or more sensors 102, respectively, of FIG. 1. The mixed depth sensing system 900 includes an emitter 910 and a sensor 945. During the ToF mode, the emitter 910 may operate in a ToF projection mode, and the sensor 945 may operate in a ToF sensing mode, as described with respect to FIG. 8. The mixed depth sensing system 900 includes a DOE 920 and a diffuser 930 coupled to the front of the DOE 920. The diffuser 930 may be switched on (e.g., for flood distribution) during the ToF projection mode. Specifically, during the ToF projection mode, the emitter 910 may transmit pulsed signal 911 toward an object 940 while the diffuser 930 diffuses the emitted light to project a flood distribution (e.g., a uniform illumination) onto the scene. A reflected signal 941 may arrive at the sensor 945, and the sensor 945 may calculate ToF depth information based on an amount of time for the light to be reflected back to the sensor 945 for each pixel.

Figure 9B:
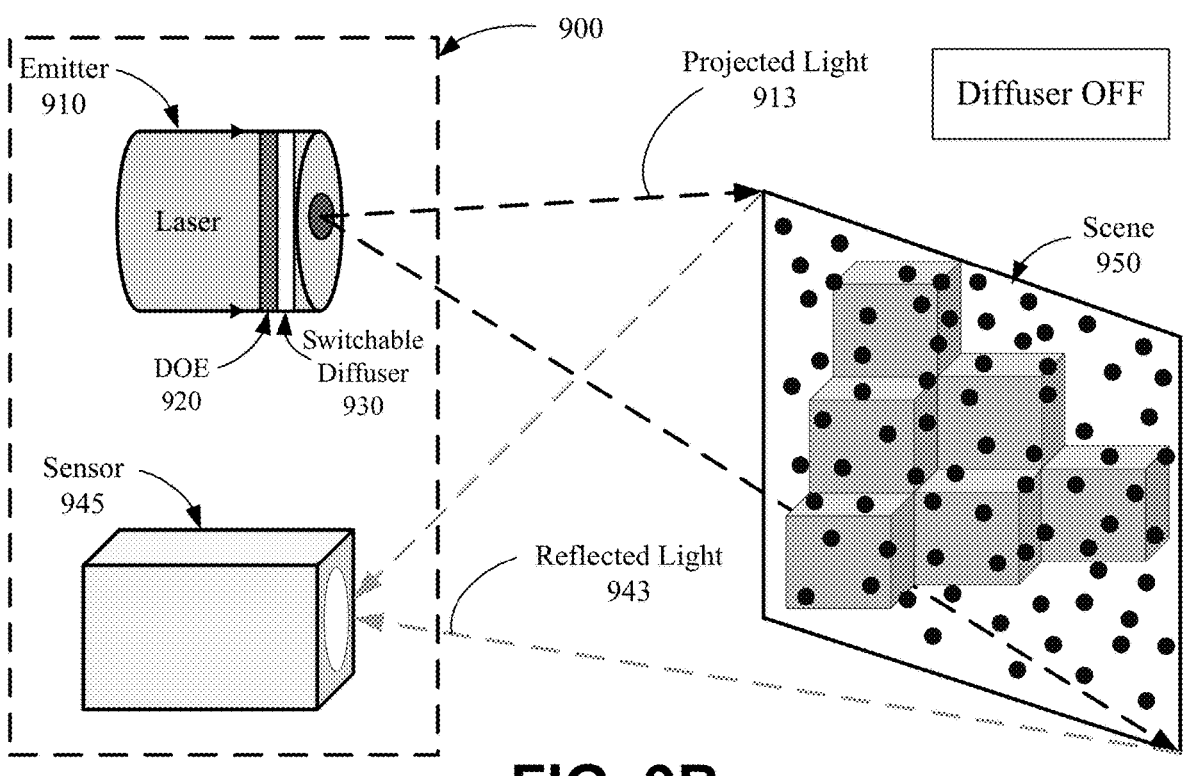
FIG. 9B illustrates the example mixed depth sensing system of FIG. 10A operating in a second mode, in accordance with some examples of the present disclosure.

FIG. 9B shows the example mixed depth sensing system 900 operating in a second (e.g., SL) mode. During the SL mode, the emitter 910 may operate in a SL projection mode, and the sensor 945 may operate in a SL sensing mode, as described with respect to FIG. 8. The diffuser 930 may be switched off (e.g., functioning as a transparent piece of glass) during the SL projection mode. Specifically, during the SL projection mode, the emitter 910 may project a sparse distribution (e.g., a DOE pattern) toward a scene 950, which will pass through the diffuser 930 relatively unaffected (as projected light 913), and onto the scene 950 (e.g., as a dot matrix pattern). Reflected light 943 may arrive at the sensor 945, and the sensor 945 may calculate SL depth information, Z(SL), based on how the projected light 913 distorts on the scene 950. An active depth controller (such as the active depth controller 110 of FIG. 1) may use Z(SL) during a calculation of ToF depth information, Z(ToF+SL), as described with respect to active depth controller 110 of FIG. 1. In this manner, the active depth controller 110 may reduce or eliminate multipath artifacts in the ToF depth information.

Figure 9C:
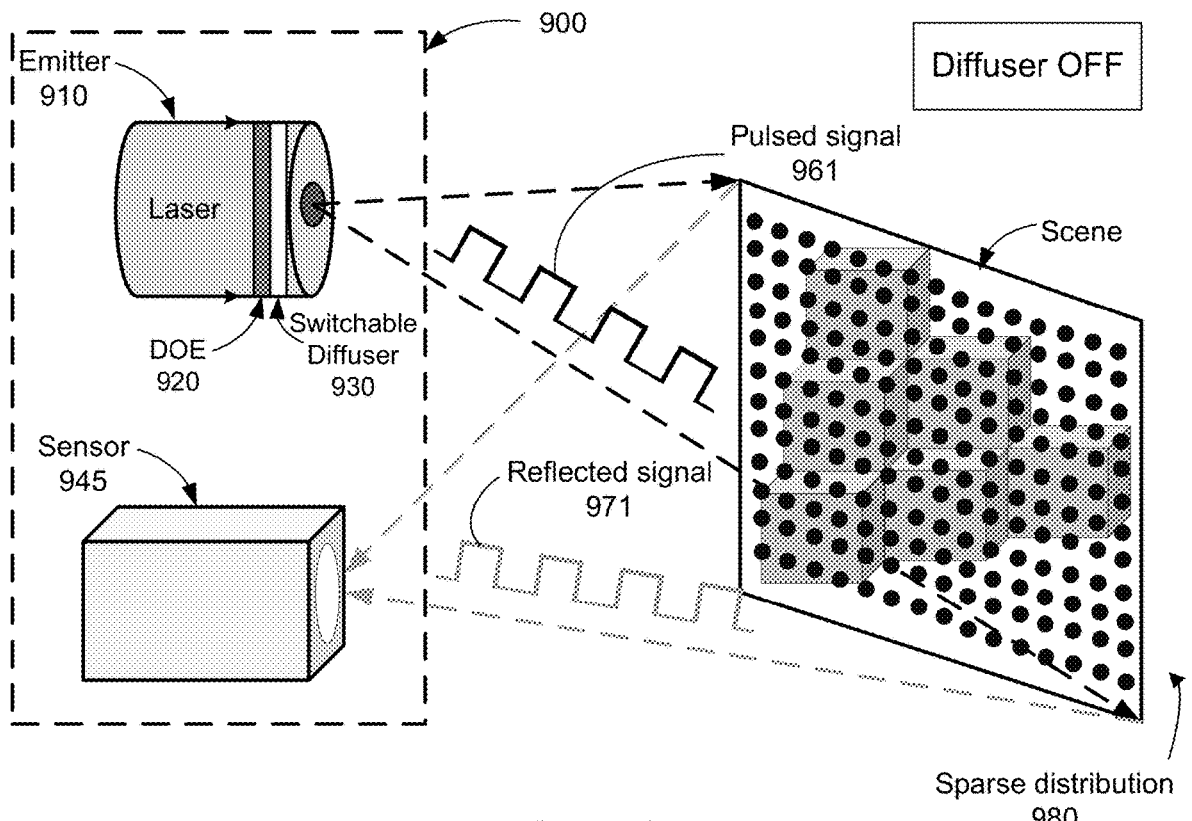
FIG. 9C illustrates the example mixed depth sensing system of FIG. 10A operating in a third mode, in accordance with some examples of the present disclosure.

FIG. 9C shows the example mixed depth sensing system 900 operating in a third (e.g., spot ToF) mode. During the spot ToF mode, the emitter 910 may operate in a spot ToF projection mode. The spot ToF mode can incorporate aspects of the SL mode and the ToF mode. For example, the emitter 910 may transmit pulsed signal 911 toward scene 950. In some cases, the pulsed signal 911 may match the pulsed signal 911 used in the ToF mode. In some implementations, during the spot ToF mode, the diffuser may be switched off (e.g., functioning as a transparent piece of glass) during the spot ToF mode. In some cases, during the spot ToF mode, the emitter 910 may project a sparse distribution 980 toward the scene 950. In some examples, the sparse distribution 980 can be pulsed based on the pulsed signal 911. In some examples, the sparse distribution 980 can be identical to the SL mode distribution. As illustrated, the sparse distribution 980 for a spot ToF can be different from the distribution of a SL mode. For example, the sparse distribution 980 does not require a structured (e.g., non-uniform) pattern. For example, the pulsed signal 961 and the reflected signal 971 can be used to determine spot ToF depth information similar to a conventional ToF measurement. However, the spot ToF depth information may be limited to portions of the scene illuminated by the sparse distribution 980 and include gaps in areas between spots, similar to SL based depth measurements.

In some cases, a reflected signal 941 may arrive at the sensor 945, and the sensor 945 may calculate spot ToF depth information based on an amount of time for the light to be reflected back to the sensor 945 for each pixel. In some examples, the ToF depth can be calculated for pixel positions corresponding to the spots of the spot ToF illumination pattern. In some cases, light that travels by an indirect path (e.g., MPI) can appear in the spot ToF depth information as background illumination. For example, diffuse light reflecting from the scene 950 can appear in the background of the spots (e.g., between the spots) as well as on the spots. In some cases, background illumination subtraction can be used to adjust the for the effects of MPI from the spot ToF depth information. In some cases, thresholding can be applied to obtain the depth information only from the spots. In some cases, the background illumination (e.g., the illumination between the spots) can be subtracted from the spots to reduce or eliminate the MPI based on the depths obtained from the spots. In some implementations, thresholding and/or background subtraction can be applied locally (e.g., to small groups of pixels). In some aspects, thresholding and background subtraction can be applied globally. As one illustrative and non-limiting example, the background illumination depth measurements between the spots can be averaged and the average value can be subtracted for all pixel values.

In some cases, a different DOE 920, different emitter 910, and/or different sensor 945 can be used for the spot ToF mode and the SL mode. In some examples, two or more of the ToF mode, SL mode, and/or spot ToF mode can share common components. For example, it can be advantageous to use spot ToF depth information to correct for MPI in ToF depth information using a shared emitter 910 and sensor 945 with a switchable diffuser 930 to switch between the two corresponding illumination modes. In some cases, the same pulsed signal pattern can be used for both ToF and spot ToF depth measurements. As a result, in some cases, ToF depth information and spot ToF depth information can be aligned and scaled similarly. For example, in some cases, an amount of error (e.g., an amount of MPI in the ToF depth information) can be determined by directly subtracting spot ToF depth information from ToF depth information. In contrast, SL depth information may require alignment and/or calibration before being used to determine an amount of error (e.g., an amount of MPI in ToF depth information and/or spot ToF information). In some cases, such a calibration can be required even when the SL depth information is acquired using a shared emitter 910 and sensor 945 with the ToF depth information and/or the spot ToF depth information.

Figure 10A:
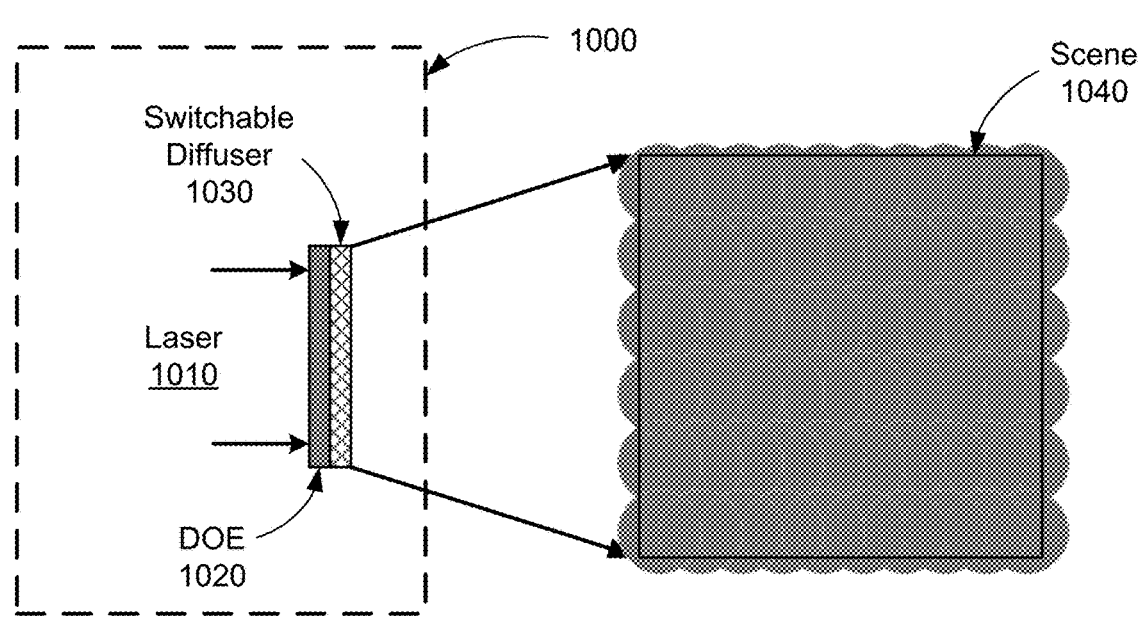
FIG. 10A illustrates a simplified illustration of the mixed depth sensing system shown in FIG. 9A, in accordance with some examples of the present disclosure.

FIG. 10A is a simplified illustration of a mixed depth sensing system 1000 operating in a first (e.g., ToF) mode. The mixed depth sensing system 1000 may be an example implementation of the mixed depth sensing system 900, as described with respect to FIG. 9A through FIG. 9C. The laser 1010 emits light through the DOE 1020. In the ToF mode, the diffuser 1030 may be switched on (indicated with a hatched pattern), and the DOE distribution may be diffused when passing through the diffuser 1030, provides diffuse illumination to the scene 1040. The laser 1010 can emit light with a pattern (e.g., a pulsing pattern) that can be used to determine depth information.

Figure 10B:
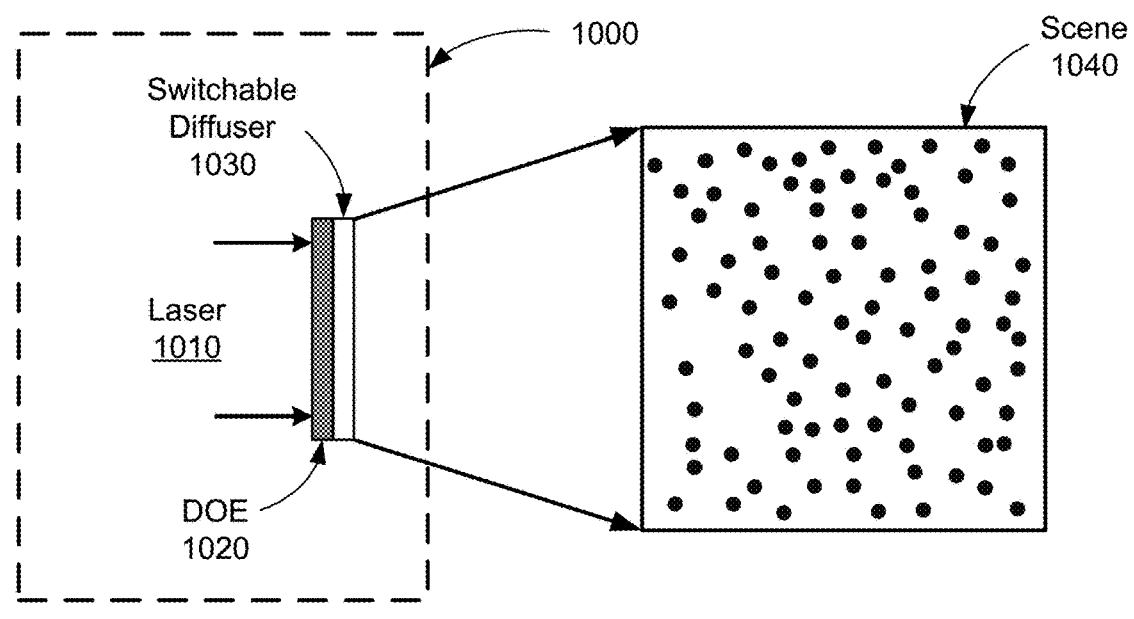
FIG. 10B illustrates a simplified illustration of the mixed depth sensing system shown in FIG. 9B, in accordance with some examples of the present disclosure.

FIG. 10B is a simplified illustration of the mixed depth sensing system 1000 of FIG. 10A operating in a second (e.g., SL) mode. The mixed depth sensing system 1000 may be an example implementation of the mixed depth sensing system 900, as described with respect to FIG. 9B. The laser 1010 emits light through a DOE 1020. In the SL mode, the diffuser 1030 may be switched off (indicated with a lacked of a hatched pattern), and the DOE distribution may be projected through the diffuser 1030 (e.g., unaltered) and onto the scene 1040.

Figure 10C:
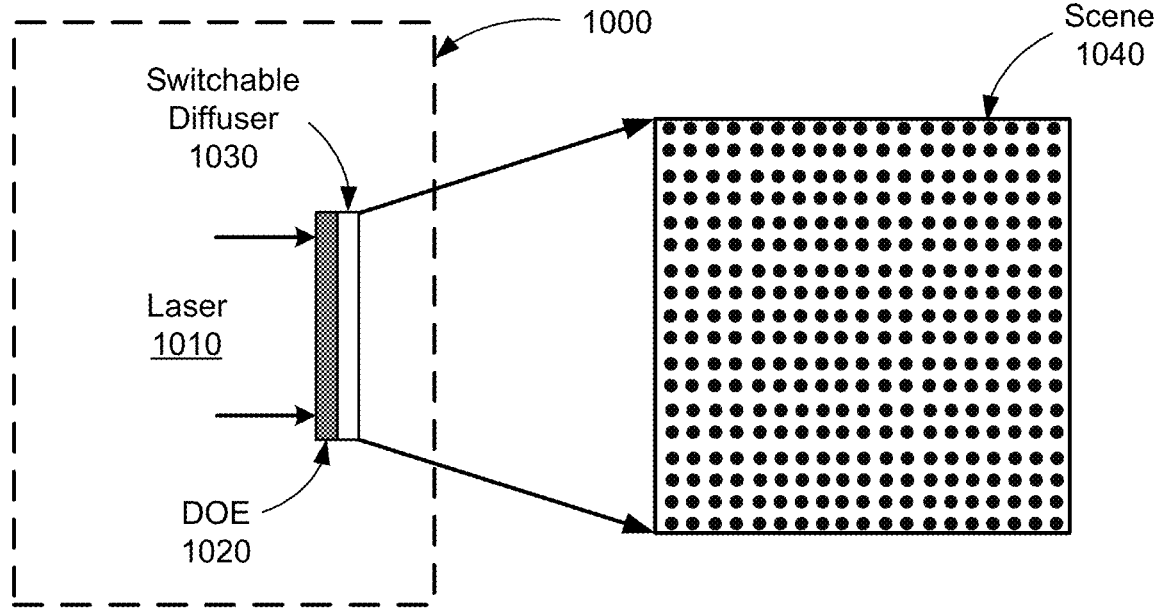
FIG. 10C illustrates a simplified illustration of the mixed depth sensing system shown in FIG. 9C, in accordance with some examples of the present disclosure.

FIG. 10C is a simplified illustration of the mixed depth sensing system 1000 of FIG. 10A operating in a second (e.g., spot ToF) mode. The mixed depth sensing system 1000 may be an example implementation of the mixed depth sensing system 900, as described with respect to FIG. 9C. The laser 1010 emits light through a DOE 1020. In the spot ToF mode, the diffuser 1030 may be switched off (indicated with a lack of a hatched pattern), and the DOE distribution may be projected through the diffuser 1030 (e.g., unaltered) and onto the scene 1040. The laser 1010 can emit light with a pattern (e.g., a pulsing pattern) that can be used to determine depth information. In some examples, the dot pattern can be a periodic dot pattern as illustrated in FIG. 10C. In some cases, the dot pattern can also be a random dot pattern identical to the SL dot pattern illustrated in FIG. 10B.

Figure 11:
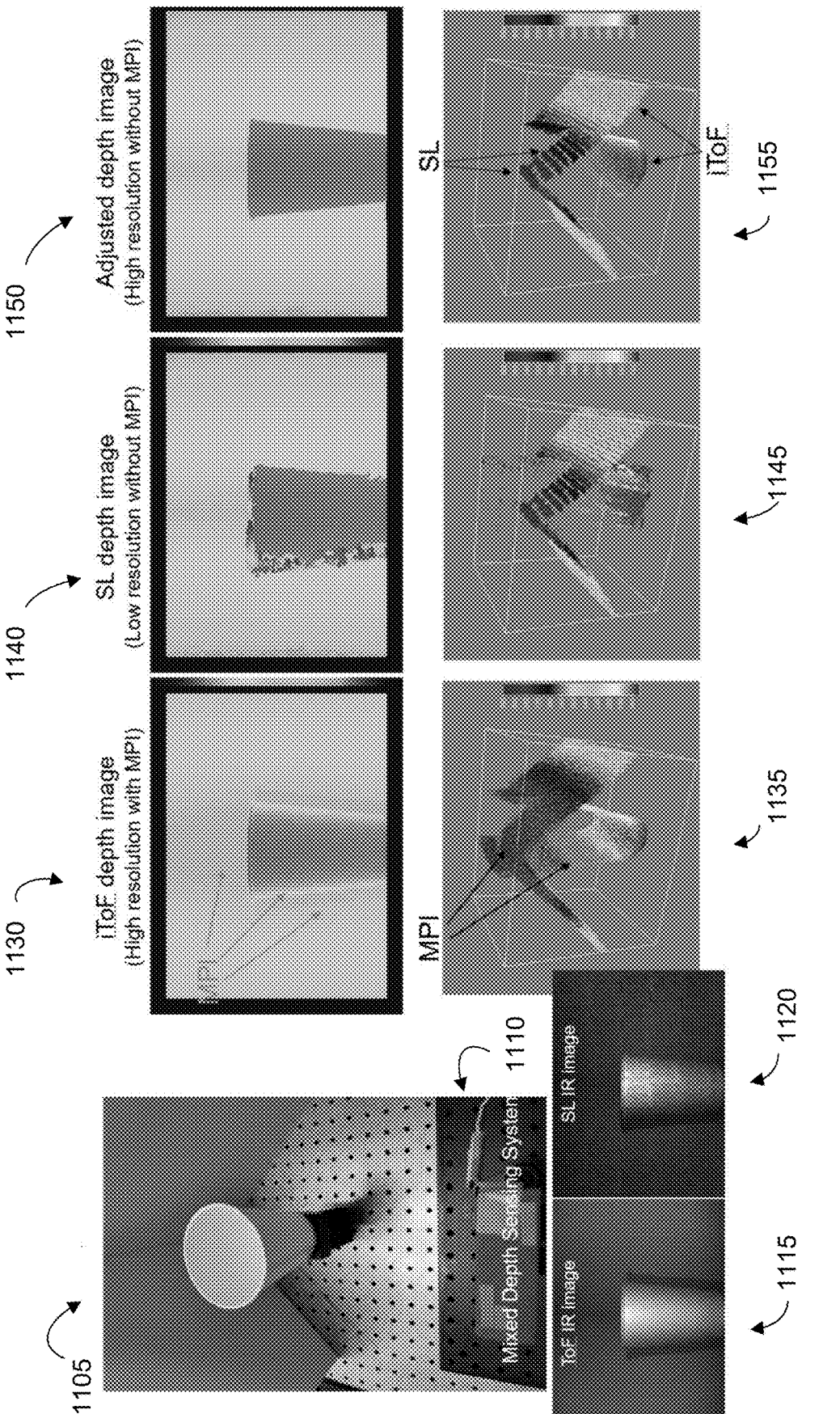
FIG. 11 is a diagram illustrating an adjusted depth image based on a ToF depth image and an SL depth image, in accordance with some examples of the present disclosure.

FIG. 11 is a diagram illustrating an adjusted depth image based on a ToF depth image and an SL depth image in an experimental configuration. In the illustrated example, depth information for a scene 1105 of a corner and a beverage container were captured by a mixed depth sensing system 1110. In the experiment, the mixed depth sensing system 1110 captured ToF depth information in a ToF illumination mode and SL depth information in a SL illumination mode. The ToF depth information and SL depth information were captured with a shared emitter (e.g., emitter 910 of FIG. 9A through FIG. 9C), a shared sensor (e.g., sensor 945 of FIG. 9A through FIG. 9C), a DOE (e.g., 920 of FIG. 9A through FIG. 9C, and a switchable diffuser (e.g., switchable diffuser 930 of FIG. 9A through FIG. 9C). As illustrated, the raw ToF image 1115, the ToF depth image 1130, and the ToF depth distribution 1135 exhibit MPI near the corner in the scene as well as around the edges of the beverage container. As also shown, the raw SL image 1120, the SL depth image 1140, and the SL depth distribution 1145 exhibit a lower resolution than the ToF depth information, but the effect of MPI on the SL depth information is minimal when compared to the ToF depth information. An adjusted depth image 1150 and adjusted depth distribution 1155 were generated by fusing the ToF depth information and the SL depth information (e.g., by the active depth controller 110 of FIG. 1). As illustrated, the adjusted depth image 1150 and the adjusted depth distribution 1155 combine the low MPI of the SL information with the high resolution of the ToF image. As noted above, similar techniques can be used to adjust ToF depth information based on a spot ToF depth information and/or to adjust spot ToF depth information based on SL depth information without departing from the scope of the present disclosure.

FIG. 12 is a flow diagram illustrating an example of a process 1200 of processing one or more frames. At block 1202, the process 1200 includes obtaining a first depth image of a scene. In some cases, the first depth image of the scene is associated with a first illumination configuration. In some examples, the first illumination configuration includes illuminating the scene with a first type of illumination.

At block 1204, the process 1200 includes obtaining a second depth image of the scene. In some cases, the second depth image is associated with a second illumination configuration, the second illumination configuration being different from the first illumination configuration. In some aspects, the second illumination configuration includes illuminating the scene with a second type of illumination. In some cases, the second type of illumination is different from the first type of illumination. In some implementations, the first depth image and the second depth image are based on time of flight (ToF) measurements. In some cases, the first illumination configuration includes a pulsed illumination pattern and the second illumination configuration includes the pulsed illumination pattern. In some cases, the second illumination configuration includes a uniformly spaced dot pattern. In some cases, the second illumination configuration includes a non-uniform dot pattern (e.g., a SL dot pattern).

At block 1206, the process 1200 includes determining, based on the second depth image, MPI associated with the first depth image.

At block 1208, the process 1200 includes generating, based on determining the MPI associated with the first depth image an adjusted depth image. In some examples, the adjusted depth image includes one or more pixels from the first depth image and one or more adjusted pixels based on one or more additional depth images, different from the first depth image. In some cases, the one or more additional depth images includes the second depth image.

In some examples, the one or more additional depth images includes a third depth image of the scene. In some cases, the third depth image is associated with the second illumination configuration. In some examples, the second depth image is based on a structured light measurement and the third depth image is based on a time of flight (ToF) measurement.

In some implementations, the first depth image is based on ToF measurements and the second depth image is based on detecting a non-uniform illumination pattern associated with the second illumination configuration. In some examples, the second depth image is based on a structured light illumination configuration.

In some examples, the process 1200 includes generating, based on determining the MPI associated with the first depth image, the adjusted depth image includes determining that a numerical correspondence between a pixel of the first depth image and a corresponding pixel of the second depth image exceeds an MPI threshold. In some cases, the process 1200 includes replacing the pixel of the first depth image with an adjusted depth pixel based on determining that the numerical correspondence between the pixel of the first depth image and the corresponding pixel of the second depth image exceeds the MPI threshold. In some aspects, the adjusted depth pixel includes the corresponding pixel of the second depth image. In some cases, the adjusted depth pixel includes an additional corresponding pixel of a third depth image, different from the first depth image and the second depth image. In some examples, the process 1200 includes determining the numerical correspondence between the pixel of the first depth image and the corresponding pixel of the second depth image based on at least one or more of moving window image fusion or fixed grid image fusion.

In some examples, the process 1200 includes transmitting light along an optical axis using an illumination source; generating an illumination pattern for the light generated by the illumination source using a diffractive optical element (DOE) positioned relative to the optical axis; and one of: diffusing, using a switchable diffuser, the illumination pattern in an active mode; and allowing, using the diffuser, the illumination pattern to pass through in an inactive mode. In some examples, the first illumination configuration includes operating the switchable diffuser in the active mode to generate the first type of illumination. In some examples, the second illumination configuration includes operating the switchable diffuser in the inactive mode to generate the second type of illumination.

In some examples, the processes described herein (e.g., process 1200 and/or other process described herein) may be performed by a computing device or apparatus. In one example, one or more of the processes can be performed mixed depth sensing system 100 of FIG. 1. In another example, one or more of the processes can be performed by the computing system 1300 shown in FIG. 13. For instance, a computing device with the computing system 1300 shown in FIG. 13 can include the components of the mixed depth sensing system 100 and can implement the operations of the process 1200 of FIG. 12 and/or other process described herein.

The computing device can include any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, and/or any other computing device with the resource capabilities to perform the processes described herein, including the process 1200 and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1200 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1200 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
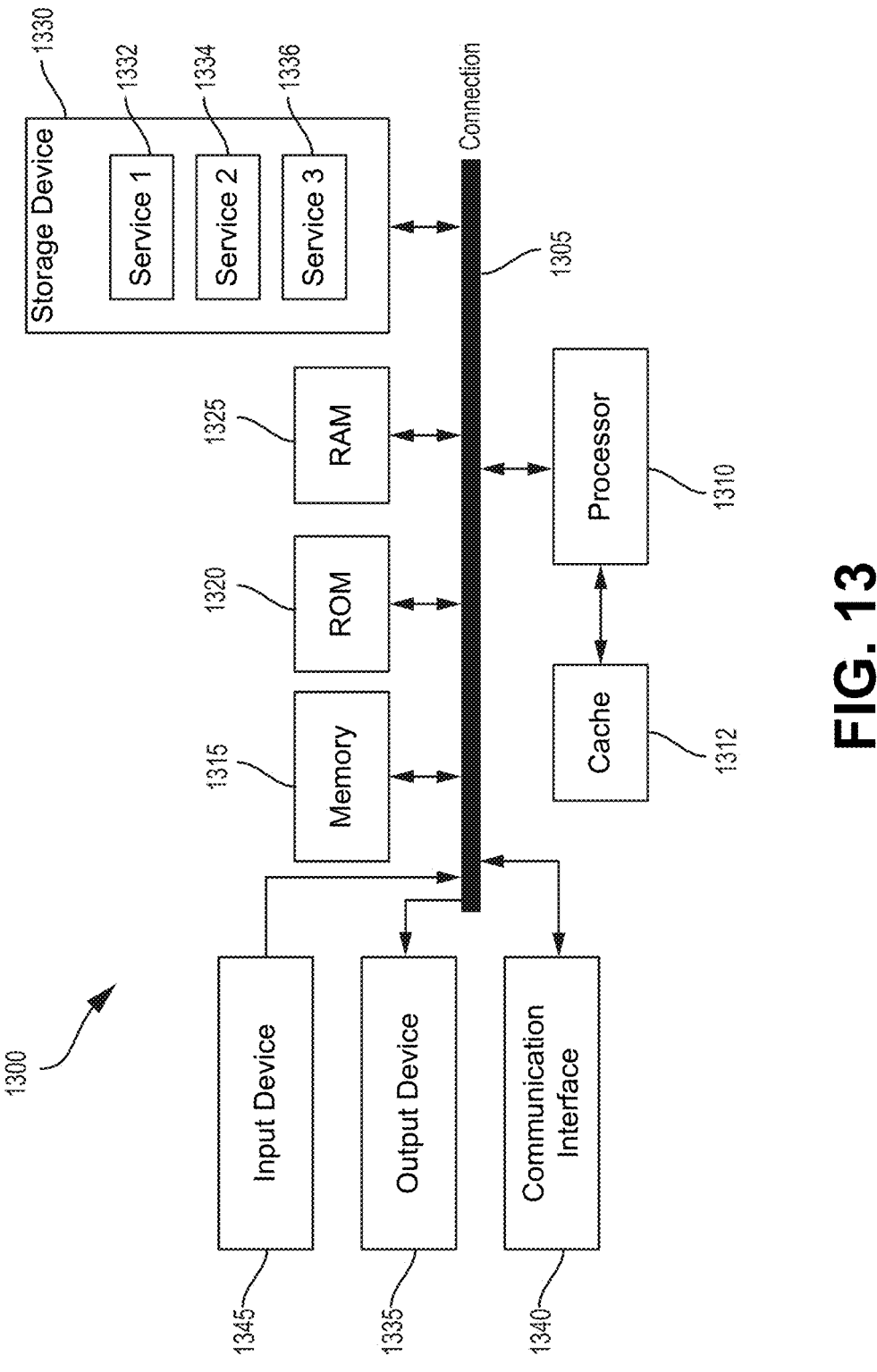
FIG. 13 is a diagram illustrating an example of a computing system for implementing certain aspects described herein.

FIG. 13 is a diagram illustrating an example of a system for implementing certain aspects of the present technology. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1300 includes at least one processing unit (CPU or processor) 1310 and connection 1305 that couples various system components including system memory 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300. Computing system 1300 can include communications interface 1340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based Bei-Dou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, mobile phones (e.g., smart phones or other types of mobile phones), tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to (" ") and greater than or equal to (" ") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for depth sensing comprising: a memory; and at least one processor coupled to the memory, the at least one processor configured to: obtain a first depth image of a scene, wherein the first depth image of the scene is associated with a first illumination configuration, wherein the first illumination configuration comprises illuminating the scene with a first type of illumination; obtain a second depth image of the scene, wherein the second depth image is associated with a second illumination configuration, the second illumination configuration being different from the first illumination configuration, wherein the second illumination configuration comprises illuminating the scene with a second type of illumination, wherein the second type of illumination is different from the first type of illumination; determine, based on the second depth image, multipath interference (MPI) associated with the first depth image; and generate, based on determining the MPI associated with the first depth image an adjusted depth image, wherein the adjusted depth image includes one or more pixels from the first depth image and one or more adjusted pixels based on one or more additional depth images, different from the first depth image.

Aspect 2. The apparatus of Aspect 1, wherein the one or more additional depth images comprises the second depth image.

Aspect 3. The apparatus of any of Aspects 1 to 2, wherein the one or more additional depth images comprises a third depth image of the scene, wherein the third depth image is associated with the second illumination configuration, wherein the second depth image is based on a structured light measurement and the third depth image is based on a time of flight (ToF) measurement.

Aspect 4. The apparatus of any of Aspects 1 to 3, wherein the first depth image and the second depth image are based on time of flight (ToF) measurements.

Aspect 5. The apparatus of any of Aspects 1 to 4, wherein the first illumination configuration comprises a pulsed illumination pattern and the second illumination configuration comprises the pulsed illumination pattern.

Aspect 6. The apparatus of any of Aspects 1 to 5, wherein the second illumination configuration comprises a uniformly spaced dot pattern.

Aspect 7. The apparatus of any of Aspects 1 to 6, wherein the second illumination configuration comprises a non-uniform dot pattern.

Aspect 8. The apparatus of any of Aspects 1 to 7, wherein the first depth image is based on ToF measurements and the second depth image is based on detecting a non-uniform illumination pattern associated with the second illumination configuration.

Aspect 9. The apparatus of any of Aspects 1 to 8, wherein the second depth image is based on a structured light illumination configuration.

Aspect 10. The apparatus of any of Aspects 1 to 9, wherein, to generate, based on determining the MPI associated with the first depth image, an adjusted depth image, the at least one processor is configured to: determine that a numerical correspondence between a pixel of the first depth image and a corresponding pixel of the second depth image exceeds an MPI threshold; and based on a determination that the numerical correspondence between the pixel of the first depth image and the corresponding pixel of the second depth image exceeds the MPI threshold, replace the pixel of the first depth image with an adjusted depth pixel.

Aspect 11. The apparatus of any of Aspects 1 to 10, wherein the adjusted depth pixel comprises the corresponding pixel of the second depth image.

Aspect 12. The apparatus of any of Aspects 1 to 11, wherein the adjusted depth pixel comprises an additional corresponding pixel of a third depth image, different from the first depth image and the second depth image.

Aspect 13. The apparatus of any of Aspects 1 to 12, wherein determining the numerical correspondence between the pixel of the first depth image and the corresponding pixel of the second depth image comprises at least one or more of moving window image fusion or fixed grid image fusion.

Aspect 14. The apparatus of any of Aspects 1 to 13 further comprising: an illumination source configured to transmit light along an optical axis; a diffractive optical element (DOE) positioned relative to the optical axis to generate an illumination pattern for the light generated by the illumination source; and a switchable diffuser configured to: diffuse the illumination pattern in an active mode; and allow the illumination pattern to pass through in an inactive mode.

Aspect 15. The apparatus of Aspect 14, wherein the first illumination configuration comprises operating the switchable diffuser in the active mode to generate the first type of illumination and the second illumination configuration comprises operating the switchable diffuser in the inactive mode to generate the second type of illumination.

Aspect 16. A method for depth sensing comprising: obtaining a first depth image of a scene, wherein the first depth image of the scene is associated with a first illumination configuration, wherein the first illumination configuration comprises illuminating the scene with a first type of illumination; obtaining a second depth image of the scene, wherein the second depth image is associated with a second illumination configuration, the second illumination configuration being different from the first illumination configuration, wherein the second illumination configuration comprises illuminating the scene with a second type of illumination, wherein the second type of illumination is different from the first type of illumination; determining, based on the second depth image, multipath interference (MPI) associated with the first depth image; and generating, based on determining the MPI associated with the first depth image an adjusted depth image, wherein the adjusted depth image includes one or more pixels from the first depth image and one or more adjusted pixels based on one or more additional depth images, different from the first depth image.

Aspect 17. The method of Aspect 16, wherein the one or more additional depth images comprises the second depth image.

Aspect 18. The apparatus of any of Aspects 16 to 17, wherein the one or more additional depth images comprises a third depth image of the scene, wherein the third depth image is associated with the second illumination configuration, wherein the second depth image is based on a structured light measurement and the third depth image is based on a time of flight (ToF) measurement.

Aspect 19. The apparatus of any of Aspects 16 to 18, wherein the first depth image and the second depth image are based on time of flight (ToF) measurements.

Aspect 20. The apparatus of any of Aspects 16 to 19, wherein the first illumination configuration comprises a pulsed illumination pattern and the second illumination configuration comprises the pulsed illumination pattern.

Aspect 21. The apparatus of any of Aspects 16 to 20, wherein the second illumination configuration comprises a uniformly spaced dot pattern.

Aspect 22. The apparatus of any of Aspects 16 to 21, wherein the second illumination configuration comprises a non-uniform dot pattern.

Aspect 23. The apparatus of any of Aspects 16 to 22, wherein the first depth image is based on ToF measurements and the second depth image is based on detecting a non-uniform illumination pattern associated with the second illumination configuration.

Aspect 24. The apparatus of any of Aspects 16 to 23, wherein the second depth image is based on a structured light illumination configuration.

Aspect 25. The apparatus of any of Aspects 16 to 24, wherein, to generate, based on determining the MPI associated with the first depth image, an adjusted depth image, the at least one processor is configured to: determine that a numerical correspondence between a pixel of the first depth image and a corresponding pixel of the second depth image exceeds an MPI threshold; and based on a determination that the numerical correspondence between the pixel of the first depth image and the corresponding pixel of the second depth image exceeds the MPI threshold, replace the pixel of the first depth image with an adjusted depth pixel.

Aspect 26. The apparatus of any of Aspects 16 to 25, wherein the adjusted depth pixel comprises the corresponding pixel of the second depth image.

Aspect 27. The apparatus of any of Aspects 16 to 26, wherein the adjusted depth pixel comprises an additional corresponding pixel of a third depth image, different from the first depth image and the second depth image.

Aspect 28. The apparatus of any of Aspects 16 to 27, wherein determining the numerical correspondence between the pixel of the first depth image and the corresponding pixel of the second depth image comprises at least one or more of moving window image fusion or fixed grid image fusion.

Aspect 29. The apparatus of any of Aspects 16 to 28 further comprising: an illumination source configured to transmit light along an optical axis; a diffractive optical element (DOE) positioned relative to the optical axis to generate an illumination pattern for the light generated by the illumination source; and a switchable diffuser configured to: diffuse the illumination pattern in an active mode; and allow the illumination pattern to pass through in an inactive mode.

Aspect 30. The apparatus of Aspect 29, wherein the first illumination configuration comprises operating the switchable diffuser in the active mode to generate the first type of illumination and the second illumination configuration comprises operating the switchable diffuser in the inactive mode to generate the second type of illumination.

Aspect 31: A non-transitory computer-readable storage medium having stored thereon instructions which, when executed by one or more processors, cause the one or more processors to perform any of the operations of aspects 1 to 30.

Aspect 32: An apparatus comprising means for performing any of the operations of aspects 1 to 30.

Aspect 33: An apparatus for depth sensing comprising: a memory; and at least one processor coupled to the memory, the at least one processor configured to: obtain a first depth image of a scene, wherein the first depth image of the scene is associated with a first illumination configuration, wherein the first illumination configuration comprises illuminating the scene with a first illumination pattern based on a time of flight measurement; obtain a second depth image of the scene, wherein the second depth image is associated with a second illumination configuration, the second illumination configuration being different from the first illumination configuration, wherein the second illumination configuration comprises illuminating the scene with a second illumination pattern and the second depth image is based on a structured light depth measurement; determine, based on the second depth image, multipath interference (MPI) associated with the first depth image; and generate, based on determining the MPI associated with the first depth image an adjusted depth image, wherein the adjusted depth image includes one or more pixels from the first depth image and one or more adjusted pixels based on one or more additional depth images, different from the first depth image.

Aspect 34. A method comprising: obtaining a first depth image of a scene, wherein the first depth image of the scene is associated with a first illumination configuration, wherein the first illumination configuration comprises illuminating the scene with a first type of illumination; obtaining a second depth image of the scene, wherein the second depth image is associated with a second illumination configuration, the second illumination configuration being different from the first illumination configuration, wherein the second illumination configuration comprises illuminating the scene with a second type of illumination, wherein the second type of illumination is different from the first type of illumination; determining, based on the second depth image, multipath interference (MPI) associated with the first depth image; and generating, based on determining the MPI associated with the first depth image an adjusted depth image, wherein the adjusted depth image includes one or more pixels from the first depth image and one or more adjusted pixels based on one or more additional depth images, different from the first depth image.

Aspect 35: A non-transitory computer-readable storage medium having stored thereon instructions which, when executed by one or more processors, cause the one or more processors to perform any of the operations of aspects 1 to 30.

Aspect 36: An apparatus comprising means for performing any of the operations of aspects 1 to 30.

Aspect 37: A non-transitory computer-readable storage medium having stored thereon instructions which, when executed by one or more processors, cause the one or more processors to perform any of the operations of aspects 1 to 30 and 33 to 34.

Aspect 38: An apparatus comprising means for performing any of the operations of aspects 1 to 15 and 33.

Aspect 39: A method comprising any of the operations of aspects 1 to 30 and 33 to 34.

What is claimed is:

1. An apparatus for depth sensing comprising:
a memory; and
at least one processor coupled to the memory, the at least one processor configured to:
obtain a first depth image of a scene, wherein the first depth image of the scene is associated with a first illumination configuration, wherein the first illumination configuration comprises illuminating the scene with a first type of illumination;
obtain a second depth image of the scene, wherein the second depth image is associated with a second illumination configuration, the second illumination configuration being different from the first illumination configuration, wherein the second illumination configuration comprises illuminating the scene with a second type of illumination, wherein the second type of illumination is different from the first type of illumination;
determine that a numerical correspondence between a pixel of the first depth image and a corresponding pixel of the second depth image exceeds a multipath interference (MPI) threshold; and
generate, based on determining the numerical correspondence between the pixel of the first depth image and the corresponding pixel of the second depth image exceeds the MPI threshold, an adjusted depth image, wherein generating the adjusted depth image comprises replacing the pixel of the first depth image with an adjusted depth pixel.

2. The apparatus of claim 1, wherein the adjusted depth pixel comprises a pixel from the second depth image at a pixel position corresponding to the pixel of the first depth image.

3. The apparatus of claim 1, wherein the adjusted depth pixel comprises a pixel from a third depth image of the scene, wherein the third depth image is associated with the second illumination configuration, wherein the second depth image is based on a structured light measurement and the third depth image is based on a time of flight (ToF) measurement.

4. The apparatus of claim 1, wherein the first depth image and the second depth image are based on time of flight (ToF) measurements.

5. The apparatus of claim 4, wherein the first illumination configuration comprises a pulsed illumination pattern and the second illumination configuration comprises the pulsed illumination pattern.

6. The apparatus of claim 4, wherein the second illumination configuration comprises a uniformly spaced dot pattern.

7. The apparatus of claim 4, wherein the second illumination configuration comprises a non-uniform dot pattern.

8. The apparatus of claim 1, wherein the first depth image is based on ToF measurements and the second depth image is based on detecting a non-uniform illumination pattern associated with the second illumination configuration.

9. The apparatus of claim 8, wherein the second depth image is based on a structured light illumination configuration.

10. The apparatus of claim 1, wherein the adjusted depth pixel comprises the corresponding pixel of the second depth image.

11. The apparatus of claim 1, wherein the adjusted depth pixel comprises an additional corresponding pixel of a third depth image, different from the first depth image and the second depth image.

12. The apparatus of claim 1, wherein the at least one processor is configured to determine the numerical correspondence between the pixel of the first depth image and the corresponding pixel of the second depth image based on at least one or more of moving window image fusion or fixed grid image fusion.

13. The apparatus of claim 1 further comprising:
an illumination source configured to transmit light along an optical axis;
a diffractive optical element (DOE) positioned relative to the optical axis to generate an illumination pattern for the light generated by the illumination source; and
a switchable diffuser configured to:
diffuse the illumination pattern in an active mode; and
allow the illumination pattern to pass through in an inactive mode.

14. The apparatus of claim 13, wherein the first illumination configuration comprises operating the switchable diffuser in the active mode to generate the first type of illumination and the second illumination configuration comprises operating the switchable diffuser in the inactive mode to generate the second type of illumination.

15. A method for depth sensing comprising:

obtaining a first depth image of a scene, wherein the first depth image of the scene is associated with a first illumination configuration, wherein the first illumination configuration comprises illuminating the scene with a first type of illumination;

obtaining a second depth image of the scene, wherein the second depth image is associated with a second illumination configuration, the second illumination configuration being different from the first illumination configuration, wherein the second illumination configuration comprises illuminating the scene with a second type of illumination, wherein the second type of illumination is different from the first type of illumination;

determining that a numerical correspondence between a pixel of the first depth image and a corresponding pixel of the second depth image exceeds a multipath interference (MPI) threshold; and generating, based on determining the numerical correspondence between the pixel of the first depth image and the corresponding pixel of the second depth image exceeds the MPI threshold, an adjusted depth image, wherein generating the adjusted depth image comprises replacing the pixel of the first depth image with an adjusted depth pixel.

16. The method of claim 15, wherein the adjusted depth pixel comprises a pixel from the second depth image at a pixel position corresponding to the pixel of the first depth image.

17. The method of claim 15, wherein the adjusted depth pixel comprises a pixel from a third depth image of the scene, wherein the third depth image is associated with the second illumination configuration, wherein the second depth image is based on a structured light measurement and the third depth image is based on a time of flight (ToF) measurement.

18. The method of claim 15, wherein the first depth image and the second depth image are based on time of flight (ToF) measurements.

19. The method of claim 18, wherein the first illumination configuration comprises a pulsed illumination pattern and the second illumination configuration comprises the pulsed illumination pattern.

20. The method of claim 18, wherein the second illumination configuration comprises a uniformly spaced dot pattern.

21. The method of claim 18, wherein the second illumination configuration comprises a non-uniform dot pattern.

22. The method of claim 15, wherein the first depth image is based on ToF measurements and the second depth image is based on detecting a non-uniform illumination pattern associated with the second illumination configuration.

23. The method of claim 22, wherein the second depth image is based on a structured light illumination configuration.

24. The method of claim 15, wherein the adjusted depth pixel comprises the corresponding pixel of the second depth image.

25. The method of claim 15, wherein the adjusted depth pixel comprises an additional corresponding pixel of a third depth image, different from the first depth image and the second depth image.

26. The method of claim 15, wherein determining the numerical correspondence between the pixel of the first depth image and the corresponding pixel of the second depth image is based on at least one or more of moving window image fusion or fixed grid image fusion.

27. The method of claim 15, further comprising:

transmitting light along an optical axis using an illumination source configured;

generating an illumination pattern for the light generated by the illumination source using a diffractive optical element (DOE) positioned relative to the optical axis; and one of:

diffusing, using a switchable diffuser, the illumination pattern in an active mode; and allowing, using the switchable diffuser, the illumination pattern to pass through in an inactive mode.

28. The method of claim 27, wherein the first illumination configuration comprises operating the switchable diffuser in the active mode to generate the first type of illumination and the second illumination configuration comprises operating the switchable diffuser in the inactive mode to generate the second type of illumination.

* * * * *